United States Patent
Hossain et al.

(10) Patent No.: US 11,753,596 B2
(45) Date of Patent: Sep. 12, 2023

(54) CO-GASIFICATION OF VACUUM GAS OIL (VGO) AND BIOMASS TO PRODUCE SYNGAS/HYDROGEN

(71) Applicant: King Fahd University of Petroleum and Minerals, Dhahran (SA)

(72) Inventors: Mohammad Mozahar Hossain, Dhahran (SA); Tareq Ali Salem Al-Attas, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 715 days.

(21) Appl. No.: 16/237,777

(22) Filed: Jan. 2, 2019

(65) Prior Publication Data
US 2020/0208068 A1 Jul. 2, 2020

(51) Int. Cl.
*C10J 3/06* (2006.01)
*C10J 3/20* (2006.01)
*C01B 3/02* (2006.01)

(52) U.S. Cl.
CPC .............. *C10J 3/06* (2013.01); *C01B 3/02* (2013.01); *C10J 3/20* (2013.01); *C10J 2300/092* (2013.01); *C10J 2300/0906* (2013.01); *C10J 2300/0916* (2013.01); *C10J 2300/0953* (2013.01); *C10J 2300/0956* (2013.01); *C10J 2300/0969* (2013.01)

(58) Field of Classification Search
CPC .................. C10J 3/06; C10J 3/20; C01B 3/02
USPC ............................................ 252/373; 44/307
See application file for complete search history.

(56) References Cited

U.S. PATENT DOCUMENTS

| | | | |
|---|---|---|---|
| 8,101,383 B2 | 1/2012 | Henriksen et al. | |
| 8,288,600 B2 | 10/2012 | Bartek et al. | |
| 8,617,424 B2 | 12/2013 | Badhe et al. | |
| 8,784,650 B2 | 7/2014 | Cui et al. | |
| 2008/0230444 A1 | 9/2008 | Iwadate et al. | |
| 2009/0158663 A1 | 6/2009 | Deluga et al. | |
| 2012/0073292 A1 | 3/2012 | Koseoglu | |
| 2013/0167430 A1* | 7/2013 | Harris | B01J 29/7046 137/896 |
| 2013/0264831 A1* | 10/2013 | Mason | C10J 3/62 290/1 R |
| 2015/0052634 A1* | 2/2015 | Park | C12N 15/8261 435/99 |
| 2015/0275112 A1* | 10/2015 | Boissonnet | C10K 1/006 518/703 |
| 2018/0100106 A1 | 4/2018 | Zheng et al. | |

FOREIGN PATENT DOCUMENTS

WO 2008/017741 A1 2/2008

OTHER PUBLICATIONS

Detailed Chemical Composition of Straight-run Vacuum Gas Oil and its distillates as a function of the atmospheric equivalent boiling point. Wei Wang et al. Energy and Fuels, V 30, pp. 968-974 (Year: 2016).*

(Continued)

*Primary Examiner* — Douglas B Call
(74) *Attorney, Agent, or Firm* — Oblon, McClelland, Maier & Neustadt, L.L.P.

(57) ABSTRACT

The invention is directed to a co-gasification process that uses biomass and VGO as a feedstock to produce syngas which includes a mixture of carbon monoxide and hydrogen.

16 Claims, 21 Drawing Sheets

(56) References Cited

OTHER PUBLICATIONS

Effects of biomass types on the co-pyrolysis behavior of a sub-bituminous high-sulfur coal Monikankana Saikia et al. Energ. Ecol. Enviorn. v 3 issue 5, pp. 251-265 (Year: 2018).*
Balat ; Hydrogen-Rich Gas Production from Biomass via Pyrolysis and Gasification Processes and Effects of Catalyst on Hydrogen Yield ; Energy Sources, Part A: Recovery, Utilization, and Environmental Effects, vol. 30, Issue 6 ; pp. 552-564 ; Feb. 5, 2008 ; Abstract Only ; 4 Pages.
Molino, et al. ; Glucose gasification in super-critical water conditions for both syngas production and green chemicals with a continuous process ; ScienceDirect I Renewable Energy, vol. 91 ; pp. 451-455 ; Jun. 2016 ; Abstract Only ; 2 Pages.
Skoulou, et al. ; H2 enriched fuels from co-pyrolysis of crude glycerol with biomass ; Journal of Analytical and Applied Pyrolysis 97 ; pp. 198-204 ; 2012 ; 7 Pages.
Tan, et al. ; Co-pyrolysis of heavy oil and lowdensity polyethylene in the presence of supercritical water: The suppression of coke formation ; Fuel Processing Technology 118 ; pp. 49-54 ; 2014 ; 6 Pages.
Bai, et al. ; Co-pyrolysis of residual oil and polyethylene in sub- and supercritical water ; Fuel Processing Technology 160 ; pp. 267-274; Sep. 7, 2012 ; 8 Pages.
Fogassy, et al. ; Biomass derived feedstock co-processing with vacuum gas oil for second-generation fuel production in FCC units; Applied Catalysis B: Environmental 96 ; pp. 476-485 ; Mar. 9, 2010; 10 Pages.

* cited by examiner

CO-GASIFICATION OF VACUUM GAS OIL (VGO) AND BIOMASS TO PRODUCE SYNGAS/HYDROGEN

BACKGROUND

Field of the Invention

The invention relates to systems and methods for gasification of vacuum gas oil (VGO) and biomass to produce syngas and hydrogen.

Description of Related Art

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present invention.

The use of hydrogen as a transportation fuel has received much attention as a renewable fuel that can combat harmful environmental impacts of conventional fossil fuels; Li, Kezhong, Rong Zhang, and Jicheng Bi. 2010, *Experimental Study on Syngas Production by Co-Gasification of Coal and Biomass in a Fluidized Bed*. International Journal of Hydrogen Energy 35 (7). Elsevier Ltd: 2722-26. doi:10.1016/j.ijhydene.2009.04.046; and Howaniec, Natalia, and Adam Smoliński. 2014, *Effect of Fuel Blend Composition on the Efficiency of Hydrogen-Rich Gas Production in Co-Gasification of Coal and Biomass*. Fuel 128: 442-50. doi:10.1016/j.fuel.2014.03.036, each incorporated herein by reference in its entirety.

Hydrogen has already been used as a fuel in many innovative technologies, such as zero-emission vehicles which have been successfully tested in many developed parts of the world; K. Li, Zhang, and Bi, id. 2010. Hydrogen used as a fuel may be obtained by hydrogen generation on board a vehicle or by fueling with hydrogen produced at an external source. The on-board hydrogen generation approach uses technologies that produce hydrogen from conventional liquid fuels through single-step cracking, for example, by decomposition, decarbonization, dehydrogenation, pyrolysis, splitting, or dissociation; see Ahmed, Shakeel, Abdullah Aitani, Faizur Rahman, Ali Al-Dawood, and Fahad Al-Muhaish. 2009, *Decomposition of Hydrocarbons to Hydrogen and Carbon*, Applied Catalysis A: General 359 (1-2): 1-24, doi:10.1016/j.apcata.2009.02.038, incorporated herein by reference in its entirety.

On the other hand, hydrogen fueled vehicles require filling with hydrogen that is produced externally.

Gasification and/or reforming of hydrocarbon fuels is one of the major sources of hydrogen for a transportation fuel as well as for other purposes such as power generation. Gasification is a thermochemical process that partially oxidizes a hydrocarbon feedstock, such as coal, biomass, or oil into syngas which is a mixture of hydrogen and carbon monoxide. Generally, the gasification process is carried out in an oxidizing medium or gasifying agent such as steam, air, carbon dioxide and oxygen. The gasification proceeds by a combination of thermochemical reactions including pyrolysis, reforming, water gas shift, and combustion; Nemanova, Vera, Araz Abedini, Truls Liliedahl, and Klas Engvall. 2014, *Co-Gasification of Petroleum Coke and Biomass*, Fuel 117 (Part A). Elsevier Ltd: 870-75. doi:10.1016/j.fuel.2013.09.050, incorporated herein by reference in its entirety.

Conventionally, the gasification of coal and pet coke have been considered as major feedstocks for hydrogen production. The low H/C ratio of coal or petroleum coke (pet coke) as well as impurities in these fuel stocks are significant problems. The greater the H/C ratio, the more energy is released on combustion. Consequently, gasification of biomass which has a higher H/C ratio than coal or solid petroleum feedstocks could be an advantageous way to improve gasification efficiency. Gasification of biomass inherently produces high amounts of hydrogen. Unlike coal and petroleum, biomass is a sustainable, renewable and inexpensive energy source due to its abundant availability. Moreover, since biomass consumes carbon dioxide via photosynthesis, hydrogen and syngas produced by gasification of biomass do not increase the net amount of carbon dioxide in the atmosphere, because the carbon dioxide released by oxidation of biomass, or syngas produced from the biomass does not exceed what was originally removed from the atmosphere during growth of the biomass. Thus combustion of fuels based on combustible gases obtained from biomass can be considered to be a net zero releaser of carbon dioxide and burning of biomass has been classed as a renewable energy source in the EU and UN legal frameworks, because plant stocks can be replaced with new growth.

Despite the benefits of producing hydrogen and syngas from biomass, there are some drawbacks of using biomass alone as feedstock. Biomass usually contains an excessive amount of water, oxygen and ash that can decrease heating value and efficiency of a biomass feedstock-based process; Xu, Chaofen, Song Hu, Jun Xiang, Haiping Yang, Lushi Sun, Sheng Su, Baowen Wang, Qindong Chen, and Limo He. 2014, *Kinetic Models Comparison for Steam Gasification of Coal/biomass Blend Chars*, Bioresource Technology 171 (1). Elsevier Ltd: 253-59. doi:10.1016/j.biortech.2014.07.099, incorporated herein by reference in its entirety.

Co-gasification of biomass along with a fossil fuel is one way that has been proposed to circumvent problems associated with exclusive use of biomass as a feed stock. Such a combination can also reduce the drawbacks associated with a coal or petroleum-based feed stock. For example, co-gasification can improve the H/C ratio in a product gas while minimizing emission of $SO_x$, $NO_x$ and $CO_2$; Chaofen Xu, Hu, Xiang, Yang, et al., id. 2014; K. Li, Zhang, and Bi, id. 2010; Liu, Guangjian, Eric D. Larson, Robert H. Williams, Thomas G. Kreutz, and Xiangbo Guo. 2011, *Making Fischer-Tropsch Fuels and Electricity from Coal and Biomass: Performance and Cost Analysis*. Energy and Fuels 25 (1): 415-37. doi:10.1021/ef101184e; and Kumabe, Kazuhiro, Toshiaki Hanaoka, Shinji Fujimoto, Tomoaki Minowa, and Kinya Sakanishi. 2007; Co-Gasification of Woody Biomass and Coal with Air and Steam; Fuel 86 (5-6): 684-89. doi:10.1016/j.fuel.2006.08.026, each incorporated herein by reference in their entirety.

Applying co-gasification process technologies on an industrial scale could be an attractive way to produce hydrogen with minimum environmental impacts; Farzad, Somayeh, Mohsen Ali Mandegari, and Johann F Gorgens. 2016, *A Critical Review on Biomass Gasification, Co-Gasification, and Their Environmental Assessments, Biofuel Research Journal* Biofuel Research Journal 12 (12): 483-95. doi:10.18331/BRJ2016.3.4.3, incorporated herein by reference in its entirety.

Various biomass and coal mixtures had been studied as potential co-gasification feedstocks including switchgrass/coal, rice straw/sub-bituminous coal, wood waste/sub-bituminous coal, and pine sawdust/coal, sewage sludge/coal; Farzad, Somayeh, Mohsen Ali Mandegari, and Johann F Gorgens. 2016, *A Critical Review on Biomass Gasification, Co-Gasification, and Their Environmental Assessments*, Biofuel Research Journal Biofuel Research Journal 12 (12): 483-95. doi:10.18331/BRJ2016.3.4.3; Yuan, Shuai, Zheng Hua Dai, Zhi Jie Zhou, Xue Li Chen, Guang Suo Yu, and Fu Chen Wang. 2012, *Rapid Co-Pyrolysis of Rice Straw and a Bituminous Coal in a High Frequency Furnace and Gasification of the Residual Char*, Bioresource Technology 109. Elsevier Ltd: 188-97. doi:10.1016/j.biortech.2012.01.019; Vuthaluru, H. B. 2004b, *Thermal Behaviour of Coal/biomass Blends during Co-Pyrolysis*, Fuel Processing Technology 85 (2-3): 141-55. doi:10.1016/S0378-3820(03)00112-7; and Biagini, Enrico, Federica Lippi, Luigi Petarca, and Leonardo Tognotti. 2002; *Devolatilization Rate of Biomasses and Coal-Biomass Blends: An Experimental Investigation*, Fuel 81 (8): Collot et al. 1999,1041-50. doi:10.1016/S0016-2361(01)00204-6, each incorporated herein by reference in their entirety. Other studies have focused on addition of biomass to improve overall efficiency of a gasification process; or have focused on the use oxygenates in a biomass to facilitate co-pyrolysis and tar as decomposition steps; Li, Shuaidan, Xueli Chen, Aibin Liu, Li Wang, and Guangsuo Yu. 2014, *Study on Co-Pyrolysis Characteristics of Rice Straw and Shenfu Bituminous Coal Blends in a Fixed Bed Reactor*, Bioresource Technology 155. Elsevier Ltd: 252-57. doi:10.1016/j.biortech.2013.12.119, incorporated herein by reference in its entirety.

Hydroxyl and hydrogen radicals (.OH, .H) are formed during pyrolysis of biomass and the introduction of biomass to facilitate decomposition of coal has been proposed; Krerkkaiwan, Supachita, Chihiro Fushimi, Atsushi Tsutsumi, and Prapan Kuchonthara. 2013, *Synergetic Effect during Co-Pyrolysis/gasification of Biomass and Sub Bituminous Coal*, Fuel Processing Technology 115. Elsevier B. V.: 11-18. doi :10.1016/j .fuproc.2013.03.044, incorporated herein by reference in its entirety. The effects of co-gasification of cedar bark biomass and bituminous coal have also been studied; Kajitani, Shiro, Yan Zhang, Satoshi Umemoto, Masami Ashizawa, and Saburo Hara. 2010, *Co-Gasification Reactivity of Coal and Woody Biomass in High-Temperature Gasification*, Energy & Fuels 24 (1), American Chemical Society: 145-51. doi:10.1021/ef900526h, incorporated herein by reference in its entirety. Similarly, other studies involved mixtures of pine wood with bituminous material to investigate the combined effects of biomass and coal; Jones, J. M., M. Kubacki, K. Kubica, A. B. Ross, and A. Williams. 2005, *Devolatilisation Characteristics of Coal and Biomass Blends*. Journal of Analytical and Applied Pyrolysis 74 (1-2): 502-11. doi:10.1016/j.jaap.2004.11.018, incorporated herein by reference in its entirety.

Gasification of biomass can be catalyzed or promoted in the presence of alkali and alkaline earth metals such as calcium, sodium, potassium, and magnesium which are present in biomass; Nemanova et al. 2014; Pu, Ge, Weilin Zhu, Huping Zhou, Yanguo Liu, and Zhengren Zhang. 2015. *Kinetics of Co-Gasification of Low-Quality Lean Coal and Biomass*; BioResources 10 (2): 2773-82. doi:10.15376/biores.10.2.2773-2782; Collot, A. G., Y. Zhuo, D. R. Dugwell, and R. Kandiyoti. 1999, *Co-Pyrolysis and Co-Gasification of Coal and Biomass in Bench-Scale Fixed-Bed and Fluidized Bed Reactors*, Fuel 78 (6): 667-79. doi:10.1016/S0016-2361(98)00202-6; Habibi et al., 2013, *Co-Gasification of Biomass and Non-Biomass Feedstocks: Synergistic and Inhibition Effects of Switchgrass Mixed with Sub-Bituminous Coal and Fluid Coke During CO2 Gasification*, Energy & Fuels 27 (1). American Chemical Society: 494-500. doi:10.1021/ef301567h; Chaofen Xu, Hu, Xiang, Yang, et al. 2014 ; Ding, Liang, Yongqi Zhang, Zhiqing Wang, Jiejie Huang, and Yitian Fang. 2014, *Interaction and Its Induced Inhibiting or Synergistic Effects during Co-Gasification of Coal Char and Biomass Char*, Bioresource Technology 173. Elsevier Ltd: 11-20. doi:10.1016/j.biortech.2014.09.007; Pu et al., id. 2015; Masnadi, Mohammad S., John R. Grace, Xiaotao T. Bi, C. Jim Lim, and Naoko Ellis, 2015, From *Fossil Fuels towards Renewables: Inhibitory and Catalytic Effects on Carbon Thermochemical Conversion during Co-Gasification of Biomass with Fossil Fuels*, Applied Energy 140. Elsevier Ltd: 196-209. doi:10.1016/j.apenergy.2014.12.006; Krerkkaiwan et al., id. 2013; Jeong, Hyo Jae, In Sik Hwang, and Jungho Hwang. 2015, *Co-Gasification of Bituminous Coa-Pine Sawdust Blended Char with H<inf>2</inf O at Temperatures of 750-850° C.*, Fuel 156. Elsevier Ltd: 26-29. doi: 10.1016/j.fuel.2015.04.018; and Ding et al. 2014, each incorporated herein by reference in their entirety. However, further analysis of biomass and careful selection of, or processing of, biomass suitable for co-gasification is required, for example, the presence of aluminasilicates crystals of the alkali mates, such as $KAlSi_3O_8$ and $KAlSiO_4$, $Ca_2Al_2SiO_7$, leads to reduction in co-gasification reactivity; Jones et al., id. 2005; Masnadi et al., id. 2015; Habibi et al., id. 2013.

Efficient and practical co-gasification of biomass with coal or petroleum products requires careful selection of the proportion of these feed stocks. For example, an appropriate balance of biomass to coal is important in addition to the effects of minerals to achieve the synergy effects for superior gasification performance; Xu, Chaofen, Song Hu, Jun Xiang, Liqi Zhang, Lushi Sun, Chao Shuai, Qindong Chen, Limo He, and Elbager M A Edreis. 2014, *Interaction and Kinetic Analysis for Coal and Biomass Co-Gasification by TG-FTIR*, Bioresource Technology 154. Elsevier Ltd: 313-21, doi:10.1016/ j.biortech.2013.11.101; Howaniec, Natalia, and Adam Smoliński. 2013, *Steam Co-Gasification of Coal and Biomass-Synergy in Reactivity of Fuel Blends Chars*, International Journal of Hydrogen Energy 38 (36): 16152-60. doi:10.1016/j.ijhydene.2013.10.019; Park, Dong Kyoo, Sang Done Kim, See Hoon Lee, and Jae Goo Lee. 2010, *Co-Pyrolysis Characteristics of Sawdust and Coal Blend in TGA and a Fixed Bed Reactor*. Bioresource Technology 101 (15). Elsevier Ltd: 6151-56. doi:10.1016/j.biortech.2010.02.087; Howaniec, Natalia, and Adam Smoliński. 2013, *Steam Co-Gasification of Coal and Biomass-Synergy in Reactivity of Fuel Blends Chars*, International Journal of Hydrogen Energy 38 (36): 16152-60. doi:10.1016/j.ijhydene.2013.10.01; and Brown, Liu, and Norton, id. 2000, each incorporated herein by reference in their entirety.

Proper balance of biomass and coal can provide higher hydrogen yield than that of the gasification of coal and biomass separately; Howaniec and Smoliński, id. 2014). Park et al., id. 2010 showed that the synergic effect of co-gasification of sub-bituminous coal and *Larix leptolepis* biomass can be achieved at 600° C. with coal/biomass ratio of 1:1.5. On the other hand, the synergy effects for co-gasification of lignite coal and sawdust biomass was observed with coal/biomass ratio of 1:4; Chaofen Xu, Hu, Xiang, Yang, et al., id. 2014). The excessive amount of biomass in co-gasification shows negative effects due to the deactivation of alkali metal through agglomeration; Chaofen Xu, Hu, Xiang, Yang, et al., id. 2014).

The residual oils from petroleum refining as an alternative to a coal feedstock can also be processed with biomass to produce $H_2$-rich syngas. The heavy oils, such as vacuum gas oil (VGO), are candidates for co-gasification because of their abundance and low-cost. Co-processing of VGO with biomass derived oil have been investigated in FCC processes used to produce gasoline; Pinho, Andrea de Rezende, Marlon B. B. de Almeida, Fabio Leal Mendes, Luiz Carlos Casavechia, Michael S Talmadge, Christopher M Kinchin, and Helena L Chum. 2017, *Fast Pyrolysis Oil from Pinewood Chips Co-Processing with Vacuum Gas Oil in an FCC Unit for Second Generation Fuel Production*, Fuel 188: 462-73. doi:10.1016/j.fuel.2016.10.032; Thegarid, N, G Fogassy, Y Schuurman, C Mirodatos, S Stefanidis, E F Iliopoulou, K Kalogiannis, and A A Lappas. 2014, *Second-Generation Biofuels by Co-Processing Catalytic Pyrolysis Oil in FCC Units*, Applied Catalysis B, Environmental 145: 161-66. doi:10.1016/j.apcatb.2013.01.019; and Gueudré, Laurent, Florian Chapon, Claude Mirodatos, Yves Schuurman, Robbie Venderbosch, Edgar Jordan, Stephan Wellach, and Ruben Miravalles Gutierrez. 2017, *Optimizing the Bio-Gasoline Quantity and Quality in Fluid Catalytic Cracking Co-Refining*, doi:10.1016/j.fuel.2016.12.021, each incorporated herein by reference in their entirety. A blend of 74 wt. % hydrotreated vacuum gas oil (HVGO) and 26 wt. % pine wood decanted oil (DO) provided higher naphtha yield as compared to the HVGO alone and coke formation was also decreased due to the presence of oxygenates bio-oil; Gueudré et al., id. 2017).

Surprisingly, despite ongoing need for an efficient, higher hydrogen yield process, there is no study available in the literature involving co-gasification of biomass with heavy oil such as VGO. In the context of the oil producing countries like Saudi Arabia, the liquid fuels, such as crude oils, heavy residue, and diesel, based gasification technology is highly desirable given that these countries are highly dependent on liquid fuels for electricity productions. The development of liquid fuel based gasification technology is a high priority for establishing Sustainable Energy Systems for oil producing countries as this would permit efficient use of residual oils such as VGO and VR for energy production. Moreover, there is a demand for new ways of enhancing gasification of residual oils.

In view of increasing needs for environmentally friendly fuels, such as syngas with higher hydrogen content, the inventors developed a new process for efficient production of these fuels by co-gasification of low cost petroleum-based feedstocks such as vacuum gas oil (VGO) and carbon-neutral biomass.

BRIEF SUMMARY OF THE INVENTION

The invention pertains to a co-gasification method that uses biomass in combination with a heavy petroleum distillate such as vacuum gas oil to produce syngas with high hydrogen content. Embodiments of this technology include, but are not limited to the following specific embodiments.

Embodiment 1: A non-isothermic process for producing syngas, comprising:

co-gasifying a feedstock comprising vacuum gas oil (VGO) and a biomass by ramped heating the feedstock at a rate ranging from about 10 to about 50° C./min to a temperature ranging from about 200 to about 475° C., wherein the co-gasification is performed using a purge gas, carrier gas, or gasification agent supplied at a flow rate ranging from about 50 to about 300 mL/min, wherein the VGO is described by CAS number 64741-57-7 or which is recognized in the art as a vacuum gas oil such as heavy petroleum distillates predominantly containing $C_{20}$ through $C_{50}$ hydrocarbons and boiling in the range of approximately 350° C. to 600° C.; and wherein the biomass has a C:H:O ratio in wt % of about 30-50: 4-10: 48-58;

thereby producing syngas comprising hydrogen and carbon monoxide.

A flow rate of a purge gas, carrier gas, or gasification agent can be increased proportionally to the scale of a gasification process. A flow rate ranging from about 50 to about 300 mL/min disclosed may be increased proportionately to the size of the gasification process, for example, to about 500 to 3,000 mL/min for gasification process that produces ten times more hydrogen and/or carbon monoxide. A greater volumetric flow rate for a scaled up process may be selected by those skilled in the art, for example, it may be increased by 2, 5, 10, 20, 50, 100, 200, 500, 1,000, 2,000, 5,000, or >5,000-times that of the volumetric flow rates described herein for a gasification process producing 2, 5, 10, 20, 50, 100, 200, 500, 1,000, 2,000, 5,000, or >5,000-times the amount of hydrogen and/or carbon monoxide. This range includes all intermediate values and subranges.

Flow rate may also be expressed in terms of a mass ratio with respect to the feedstock (e.g., kg gas or air/kg VGO). A flow rate based on mass ratio may be the same as those described in the Examples (see Table 2 below) herein or may vary by<5, 5, 10, 20, 30, 40, 50, 60, 70, 80, 90, 100, 200 or >200%.

The C:H:O ratios of many biomasses are comparable, however, glucose has slightly higher hydrogen and oxygen content. Therefore, for co-gasification of VGO with another kind of biomass, the VGO share can be increased to compensate shortage of H and O contents relative to glucose to reach equivalent performance as shown for co-gasifying of VGO with glucose. Thus, for a biomass with 2, 5, 10, 20, 50 or >50 mole % less H and O, the quantity of VGO can be increased to make up the difference. This range includes all intermediate values and subranges.

Embodiment 2. The process of embodiment 1, wherein the ratio in wt % of biomass to VGO ranges from 10 to 40.

Embodiment 3. The process of embodiment 1, wherein the co-gasification comprises ramped heating the feedstock in a temperature range of about 275 to about 375° C.

Embodiment 4. The process of embodiment 1, wherein the co-gasification comprises ramped heating of the feedstock at a rate ranging from 20 to 40° C./min.

Embodiment 5. The process of embodiment 1, wherein the co-gasification is performed using a purge gas, carrier gas or gasification agent supplied at a flow rate ranging from 100 to 200 mL/min. It is not necessary for the purge gas to contain water. Preferably the purge gas is substantially anhydrous.

Embodiment 6. The process of embodiment 1, wherein the gasification agent or purge gas is nitrogen.

Embodiment 7. The process of embodiment 1, wherein the gasification agent or purge gas is air.

Embodiment 8. The process of embodiment 1, wherein the gasification agent or purge gas is carbon dioxide.

Embodiment 9. The process of embodiment 1, wherein the biomass has a C:H:O ratio in wt % of about 35-40: 4-6: 50-55.

Embodiment 10. The process of embodiment 1, wherein the feedstock comprises 5-30 wt % biomass and 70-95 wt % VGO, each based on a total weight of the feedstock.

Embodiment 11. The process of embodiment 1, wherein the feedstock comprises about 20-30 wt % biomass and 70-80 wt % VGO, each based on a total weight of the feedstock.

Embodiment 12. The process of embodiment 1, wherein the biomass comprises cellulose or another carbohydrate.

Embodiment 13. The process of embodiment 1, wherein the biomass comprises switchgrass.

Embodiment 14. The process of embodiment 1, wherein the biomass comprises cardboard or paper.

Embodiment 15. The process of embodiment 1, wherein the biomass comprises lignin.

Embodiment 16. The process of embodiment 1, wherein the biomass comprises wood, sawdust or another wood product.

Embodiment 17. The process of embodiment 1, wherein the biomass comprises, or is supplemented to comprise, at least one alkali or alkali earth metal catalyst in an amount ranging from 0.001 wt % to 1 wt %, based on a total weight of the feedstock.

Embodiment 18. The process of embodiment 1, wherein at least part of the ramped heating is produced by combustion of the feedstock; or the feedstock is heated in the absence of oxygen and substantially all of the ramped heating is provided by an external source.

Embodiment 19. The process of embodiment 1 that produces syngas (i) having a higher content of hydrogen than an otherwise identical process that uses a feedstock consisting of VGO, coke, or coal, or (ii) that produces syngas with a lower content of $SO_x$, $NO_x$ or $CO_2$ that an otherwise identical process that uses a feedstock consisting of VGO, coke, or coal.

The feedstock combinations described herein provide syngas with more hydrogen content because the VGO contains a significantly higher H/C ratio compared to other carbonaceous feedstocks, such as petcoke and coal. Moreover, the presence of oxygenate species supplied by the biomass facilitates a more efficient process.

Embodiment 20. An apparatus configured to perform the process of embodiment 1.

An apparatus for practicing the process of the invention may include one or more biomass or VGO processors biomass (e.g., grinders, mixers, etc.), biomass and/or VGO input/feeds, reaction containers, mixers, heaters, pressurizers/pumps, purge lines or paths including those for perpendicular purging, outputs for hydrogen, carbon monoxide or syngas, outputs for ash and other residues, and post-gasification processors (e.g., dehydrators, $CO_2$ removers, etc.) and control devices or control algorithms. These elements may be scaled up models of the elements described in the Examples herein or their functional equivalents.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
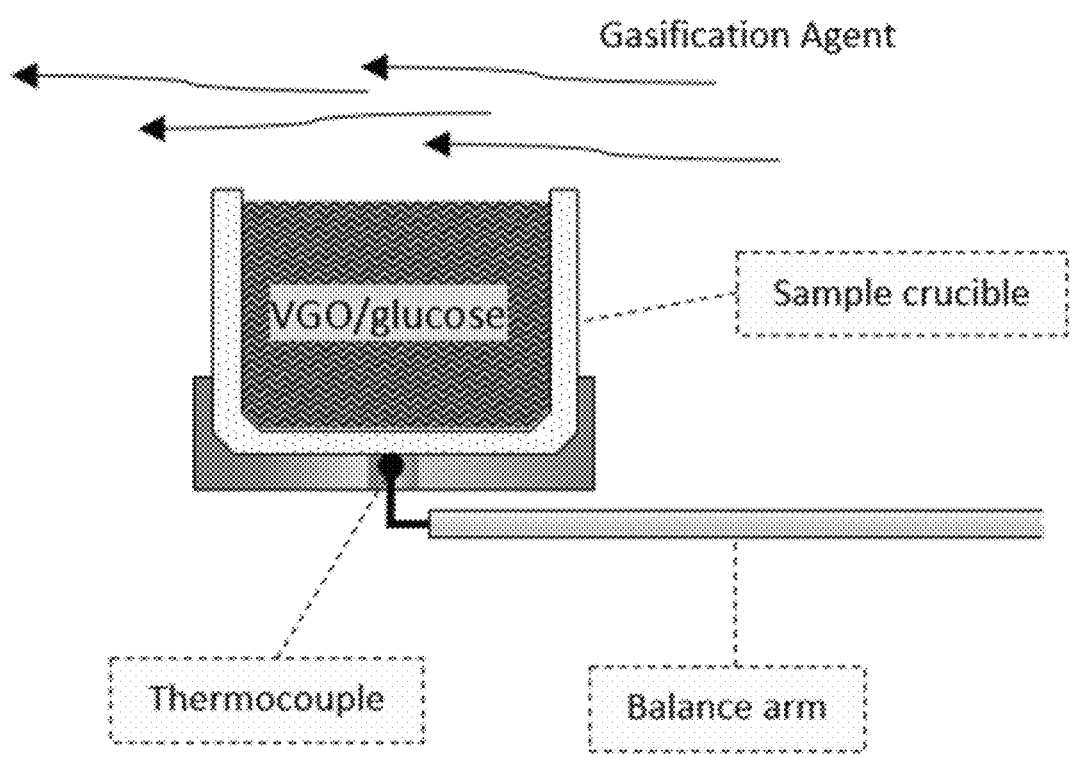
FIG. 1. Schematic diagram of the Thermogravimetric Analyzer.

The use of a binary mixture of biomass and a petroleum feedstock for a co-gasification process as well as potential synergistic effects between biomass and the petroleum feedstocks in terms of enhancing the conversion and selectivity towards the $H_2$-rich gaseous products were investigated. Heavy petroleum feedstocks have not previously been studied, so Arabian vacuum gas oil was chosen for co-gasification with glucose as a model constitution for biomass.

Gasification is a process that converts organic- or fossil fuel-based carbonaceous materials into carbon monoxide, hydrogen and carbon dioxide. This is achieved by reacting the material at a high temperature, without combustion, with a controlled amount of oxygen and/or steam. The resulting gas mixture is called syngas (from synthesis gas) or producer gas and is itself a fuel. The power derived from gasification and combustion of the resultant gas is considered to be a source of renewable energy if the gasified compounds were obtained from biomass. Co-gasification involves gasification of two or more materials such as biomass and a petroleum product.

Co-gasification proceeds by a combination of thermo-chemical reactions including pyrolysis, reforming, water gas shift, and combustion. These steps may be separately performed, or in some embodiments two or more steps may be merged, for example, by a gasification process that involves ramped heating of VGO and biomass. For example, co-gasification of a feedstock, such as VGO and biomass, may non-isothermally proceed through an initial conversion temperature, a peak temperature and a final temperature. One example of such a non-isothermal co-gasification process would be heating of a VGO and biomass feedstock from about 200° C. to 450° C. at a heating rate of about 20° C./min,. A carrier gas, such as nitrogen, carbon dioxide or air may be used to provide water during gasification and/or remove syngas as it is produced.

Gasification may be conducted in a counter-cured fixed bed gasifier, a co-current fixed bed gasifier, a fluidized bed reactor, an entrained flow gasifier or a plasma gasifier or other suitable gasifir. Gasifiers are known in the art and are incorporated by reference to https://_en.wikipedia.org/wiki/Gasification (last accessed Nov. 19, 2018).

Counter-current fixed bed or up draft gasifier may be used to perform the non-isothermic process disclosed herein. A fixed bed of carbonaceous fuel (i.e. VGO+biomass) through which the gasification agent such as steam, oxygen and/or air, flows in counter-current configuration. In some embodiments fine, undensified biomass a fan may be used to blow air into the reactor.

A co-current fixed bed or down-draft gasifier may also be employed. This apparatus functions similarly to a counter-current type apparatus, but the gasification agent gas flows in co-current configuration with the fuel (downwards, hence the name "down draft gasifier"). Heat is added to the upper part of the bed, either by combusting small amounts of the fuel or from external heat sources. The produced gas leaves the gasifier at a high temperature, and most of this heat is often transferred to the gasification agent added in the top of the bed, resulting in an energy efficiency on level with the counter-current type. Since all tars must pass through a hot bed of char in this configuration, tar levels are much lower than the counter-current type.

Another apparatus which may be used to practice a process of the invention is a fluidized bed reactor. In this apparatus the VGO/biomass feedstock is fluidized in oxygen and steam or air or other gasification agent. Ash is removed dry or as heavy agglomerates that defluidize. The temperatures are relatively low in dry ash gasifiers and a highly reactive feedstock may be used. The agglomerating gasifiers have slightly higher temperatures and fuel throughput is higher than for the fixed bed, but not as high as for the entrained flow gasifier. However, conversion efficiency can be rather low due to elutriation of carbonaceous material. Recycle or subsequent combustion of solids can be used to increase conversion. Fluidized bed gasifiers are most useful for fuels that form highly corrosive ash that would damage the walls of slagging gasifiers. Biomass fuels generally contain high levels of corrosive ash.

The process of the invention may also be performed using an entrained flow gasifier apparatus. A dry pulverized solid, an atomized liquid or slurry of a VOG/biomass feed stock is gasified with oxygen or sometimes air in co-current flow. The gasification reactions take place in a dense cloud of very fine particles. The high temperatures and pressures also mean that a higher throughput can be achieved, however thermal efficiency is somewhat lower as the gas must be cooled before it can be cleaned with existing technology. The high temperatures also mean that tar and methane are not present in the product gas; however the oxygen requirement is higher than for the other types of gasifiers. All entrained flow gasifiers remove the major part of the ash as a slag as the operating temperature is well above the ash fusion temperature. Some fuels, in particular certain types of biomasses, can form slag that is corrosive for ceramic inner walls that serve to protect the gasifier outer wall. However, some entrained flow type of gasifiers do not possess a ceramic inner wall but have an inner water or steam cooled wall covered with partially solidified slag. These types of gasifiers do not suffer from corrosive slags. Some fuels have ashes with very high ash fusion temperatures. In this case mostly limestone is mixed with the fuel prior to gasification. Addition of a little limestone will usually suffice for the lowering the fusion temperatures. The fuel particles must be much smaller than for other types of gasifiers. This means the fuel must be pulverized, which requires somewhat more energy than for the other types of gasifiers. By far the most energy consumption related to entrained flow gasification is not the milling of the fuel but the production of oxygen used for the gasification.

Biomass includes waste material from plants or animals that is not used for food or feed; it can be waste from farming (like wheat stalks, rice hulls, straw, hay or manure) or horticulture (yard waste), food processing (like corn cobs or discarded seeds, such as discarded seed corn), animal farming (manure), or human waste from sewage plants. It may be obtained from wood or paper processing wastes such as sawdust, wood chips or black liquor. It is used in various industrial processes, like energy production or as raw materials for manufacturing chemicals. Industrial biomass can be grown from numerous types of plants, including miscanthus, switchgrass, hemp, corn, poplar, willow, sorghum, sugarcane, bamboo, and a variety of tree species, such as eucalyptus, oil palm, and date palm. Biomass may also be obtained from microbes such as bacteria and fungi or from algae. Biomass may be sourced from the leaves, fronds, branches or trunks of such trees, for example, biomass may contain fronds and/or trunks of date palms. Biomass includes wastes produced by the manufacture of sugar such as sugarcane straw wastes, rice husk, bamboo dust, bagasse, coconut coir, jute and sticks. Paper, cardboard and other fibrous products, such as residential, agricultural, commercial or industrial cellulosic wastes, may also be employed.

The term "biomass" includes the types of biomass described by https://_en.wikipedia.org/wiki/Biomass (last accessed Nov. 17, 2018, incorporated by reference).

In some embodiments of the invention, other carbon sources, such as carbohydrates or sugars like glucose that are often contained in biomass may be used as biomass. In one embodiment, the process according to the invention uses switchgrass biomass. In some embodiments a biomass, such as glucose or fructose ($C_6H_{12}O_6$), fructose or another carbohydrate will have a C:H:O molar ratio of about 1:2:1 which corresponds to a wt % ratio of 40 (carbon), 6.67 (hydrogen) and 53.3 (oxygen). Cellulose contained in a biomass conforms to the formula ($C_6H_{10}O_5$)$_n$, Lignins contained in biomass have a range of C:H:O ratios because the composition of lignin varies from species to species. One example of composition from an aspen sample is 63.4% carbon, 5.9% hydrogen, 0.7% ash (mineral components), and 30% oxygen (by difference), corresponding approximately to the formula ($C_{31}H_{34}O_{11}$)$_n$. A biomass may have a wt % ratio of C:H:O which is the same as that given for glucose and switchgrass in Table 1 or in which the wt % values for C, H, and/or O do not vary by more than 1, 2, 3, 4, 5, 6, 7, 8, 9, 10, 11, 12, 13, 14, 15, 16, 17, 18, 19 or 20 wt % from the values given by Table. 1 based on the total content of C, H, and O or based on the total weight of a dry biomass.

Advantageously the energy content of a dry biomass, including carbohydrates, cellulose, lignins and other components may range from 14, 15, 16, 17, 19, 19-20 MJ/kg The ratio of biomass:VGO is typically adjusted to compensate for differences in C:H:O ratio between glucose and other kinds of biomass. This is because glucose has a high hydrogen and oxygen content. Therefore, for co-gasification of VGO with other kind of biomasses, the VGO dosage can be increased to compensate for shortage of H and O to reach to equivalent performance to co-gasifying VGO with glucose.

In some embodiments, two or more different kinds of biomass or a combination of biomass with one or more supplemental materials may be used in the process of the invention. Supplemental biomass sources include glucose, sucrose, fructose, galactose and other sugars, starches or carbohydrates, or materials containing these materials.

As mentioned above some kinds of biomass contain catalytic materials such as sodium, potassium, calcium, and magnesium or other alkali and alkaline earth metals. A content of a catalyst in a biomass used in the process of the invention may be further adjusted, for example, by increasing the concentration or content of these catalysts by 5, 10, 20, 50, 100 or 200% that found in a biomass feed stock or by adjusting the concentration of one or more alkali or alkaline earth metals in the biomass feedstock to range from 0.001, 0.005, 0.01, 0.02, 0.05, 0.1, 0.2, 0.5, 1, 2, or 5 wt %. In some embodiments the content of catalytic materials may be adjusted downward by 5, 10, 20, 50, 100, 200 or 500%, for example, by washing or rinsing of a biomass. The ranges mentioned above include all intermediate values and subranges.

Vacuum Gas Oil or VGO is part of the petroleum hydrocarbon heavy distillate family. Heavy vacuum gas oils (petroleum) are known in the art, for example, those identified by CAS number 64741-57-7 or EC number 265-058-3 which describe a material that is a complex combination of hydrocarbons produced by the vacuum distillation of the residuum from atmospheric distillation of crude oil. It consists of hydrocarbons having carbon numbers predominantly in the range of $C_{20}$ through $C_{50}$ and boiling in the range of approximately 350, 400, 450, 500, 550, to 600° C. (662° F. to 1112° F.) or any intermediate value within this range. This stream is likely to contain 5 wt. % or more of 4- to 6-membered condensed ring aromatic hydrocarbons.

VGO may have one or more or preferably most or all of the characteristics described by and incorporated by reference to http://_www.usor.com/files/pdf/5/VGO.pdf (last accessed Nov. 25, 2018).

Vacuum Gas Oil also known as cat feed, which is feedstock for fluid catalytic crackers used to make gasoline, gasoil and many other by-products. There are various names for and types of VGO including Heavy Vacuum Gas Oil (HVGO), Heavy Gas Oil, Heavy Vacuum Distillate, Partially Refined Heavy Gas Oil, Vacuum Tower Heavy Gas Oil, Vacuum Tower Side stream, Feedstock to the 634 Hydrodesulfization Unit, Untreated FCCU Feedstock, Cracker Unit Feedstock, No. 6 Fuel Oil Blending Component, Heavy Fuel Oil Blending Component, Unfinished Bunker Fuel, and $C_{20}$-$C_{50}$ Petroleum Hydrocarbons. In some embodiments, VGO is obtained from the Saudi Aramco Refinery, Saudi Arabia.

In some embodiments of the invention other petroleum products or fractions may be used instead of a VGO. These include fuel oil, which is also known as heavy oil, marine fuel or furnace oil, and include fuel oils with flash points above 42° C. products or those obtainable from crude oil that are heavier than gasoline and naphtha. In some embodiments petroleum coke, diesel oil, lubricating oil, bunker oil or other heavy distillates may be used. In other embodiments, a light distillate, middle distillate, such as kerosene, non-VGO heavy distillates or coke may be used along with or instead of a VGO.

A chemical composition and physical properties of VGO are listed in the following table:

| Physical properties and chemical composition of VGO. | |
|---|---|
| Property | Value |
| Appearance | soft but solid at room temperature |
| Color | greenish dark brown |
| Molecular weight | 442.7 |
| Density (g/cm³ at 15° C.) | 0.892 |
| Initial boiling point, IBP (° C.) | 343 |
| Final boiling point, FBP (° C.) | 641 |
| Elemental analysis (wt %) | |
| Carbon | 78.71 |
| Hydrogen | 17.80 |
| Sulfur | 2.98 |
| Nitrogen | 0.43 |
| HPLC analysis (wt %) | |
| Saturates | 13.3 |
| Polars | 18.6 |
| Aromatics | 68.1 |

These values may vary by 1, 2, 3, 4, 5, 6, 7, 8, 9, or 10%.

Biomass content of feedstock. A feedstock may contain an amount of biomass sufficient, in combination with a VGO, to produce hydrogen or syngas according to the invention. Advantageously biomass content may range from 1, 2, 5, 10, 15, 20, 21, 22, 23, 24, 25, 26, 27, 28, 29, 30, 31, 32, 33, 34, 35, 36, 37, 38, 39, 40 or >40 wt % of a feedstock, preferably the content of biomass ranges between 20 and 30 wt % of a feedstock or about 25 wt % of the feedstock.

A ratio of biomass:VGO is typically adjusted to compensate for differences in C:H:O ratio between glucose and other kinds. This is because that glucose has a high hydrogen and oxygen content. Therefore, for co-gasification of VGO with other kind of biomasses, the VGO dosage can be increased to compensate for a shortage of H and O relative to glucose as biomass to reach to an equivalent performance to a mixture of glucose and VGO.

Co-gasification processes were evaluated by applying non-isothermal thermogravimetric analysis (TGA) to different blends of VGO and biomass (glucose) as well as to processes using different heating rates. Derivative weight loss profiles found by TGA showed an increase as the glucose content in the feedstock increased up to the blend with 25 wt. % glucose where the maximum DTG (difference thermo gravimetry) showed an optimum value at 42.70 wt % /min then decreased for further amounts of biomass. One preferable range for a feedstock is about 1:3 glucose to VGO or an equivalent amount of a non-glucose biomass where VGO content is adjusted to compensate for a lower hydrogen and oxygen content of the non-glucose biomass.

Typical ramped gasification temperature process ranges may range from 30, 40, 50, 60, 70, 80, 90, 100, 150, 200, 250, 300, 350, 400, 450, 500, 550, 600, 650, 700, 750, 800, 850, 900, 950, to 1,000° C., preferably from about 200 to 475° C. The range will include a temperature at which partial combustion of the biomass and VGO can occur and a temperature at which gasification of a char, or incompletely combusted biomass or VGO occurs. Moreover, a biomass or feedstock may be dehydrated at a lower temperature and then subsequently partially combusted and gasified, or gasified at a higher temperature.

The heating rate of a ramped gasification reaction may range from 5, 10, 20, 30, 40, 50, 60, 70, 80, 90, or 100° C. per minute, preferably from about 10 to about 50° C./min.

Gasification and partial combustion reactions typically take place simultaneously.

As shown in the following Examples, the inventors studied non-isothermal co-gasification in a thermogravimetric analyzer using VGO and glucose (a biomass surrogate) as feedstocks. Work was conducted with various vacuum gas oil (VGO)/biomass blends in order to discover potential synergy of mixtures of co-gasification feedstocks. The effects of heating rate during the gasification, and of gasification agents, such as air, nitrogen and $CO_2$ were also evaluated. Potential synergistic effects were evaluated by comparing the activation energies for co-gasification with various VGO/glucose ratios. Activation energies were estimated by regression analysis of the developed kinetics model using TGA experimental data and implemented in MATLAB.

EXAMPLES

The following examples illustrate various aspects of the present invention. They are not to be construed to limit the claims in any manner whatsoever.

Materials. In these examples, the inventors evaluated co-gasification using homogeneous mixtures of glucose (a biomass surrogate) and Vacuum gas oil (VGO) as feed samples. The extra pure anhydrous glucose ($C_6H_{12}O_6$) was received from Scharlau, Spain and a VGO sample was received from Saudi Aramco Refinery, Saudi Arabia.

The feed samples were prepared by physical mixing of glucose and VGO with different weight percentages. In order to ensure homogeneous mixing, before analysis, the samples were placed under heating and stirring for 10 mins. Table 1 shows the ultimate analysis and higher heating values (HHV) of glucose and VGO.

TABLE 1

Ultimate analysis and HHV of the samples

| Property | Biomass feedstocks | | Petroleum feedstocks | |
|---|---|---|---|---|
| | Glucose | Switch-grass | VGO | Petroleum coke |
| Ultimate analysis | | | | |
| C (wt %), db[a] | 40.01 | 47.9 | 85.09 | 92.30 |
| H (wt %), db | 6.71 | 6.20 | 11.95 | 3.40 |
| N (wt %), db | — | 0.80 | 0.215 | 0.95 |
| S (wt %), db | — | 0.10 | 2.66 | 1.168 |
| O (wt %), db | 53.28 | 45.0 | 0.085[b] | 0.7 |
| HHV (MJ/kg) | 16.12 | 18.42 | n.r. | 30.87 |

[a]Higher heating value;
[b]Dry basis;
[c]Calculated by difference.

The ultimate analysis and HHVs of glucose and VGO are comparable with other biomass and petroleum feedstocks reported in the literature; *Phyllis2 -Database for Biomass and Waste.* 2018. Accessed Feb. 2, 2018. https://_www.ecn.nl/phyllis2/; Habibi, Rozita, Jan Kopyscinski, Mohammad S Masnadi, Jill Lam, John R Grace, Charles A Mims, and Josephine M Hill. 2018, *Co-Gasification of Biomass and Non-Biomass Feedstocks: Synergistic and Inhibition Effects of Switchgrass Mixed with Sub Bituminous Coal and Fluid Coke During $CO_2$ Gasification.*" Accessed Jan. 27, 2018. doi:10.1021/ef301567h; Al-Saleh, M. A., M. M. Hossain, M. A. Shalabi, T. Kimura, and T. Inui. 2003, *Hydrogen Spillover Effects on Pt-Rh Modified Co-Clay Catalysts for Heavy Oil Upgrading*, Applied Catalysis A: General 253 (2): 453-59. doi:10.1016/j.apcata.2003.06.001; and Nemanova et al., each incorporarted herein by reference in their entirety.

Non-isothermal co gasification of VGO/biomass. The analyses of co-gasification of glucose and VGO were conducted by using a thermogravimetric analyzer under various heating rates and using different carrier gases.

A SDT Q600 Model thermogravimetric analyzer (TGA) was received earlier from TA instrument, USA and FIG. 1 provides a schematic representation of the gasification using TGA. Nitrogen was mainly used as a carrier gas at a flow rate of 100 mL/min. However, additional experiments were conducted using $CO_2$ and air to demonstrate the effects of carrier gas.

The purging gas or carrier gas it typically works both as a reactant and as purging gas to prevent accumulation of products that would suppress the forward reactions from taking place. For scaled up co-gasification, the gasification agent is expressed in terms of volumetric flowrate (e.g., L/min) or as a mass ratio with respect to the feedstock (e.g., kg air/kg VGO).

The gasification temperature was set between 30-600 ° C. with different heating rates (5, 10, 20, 30, 40, 60, and 80°/min). Table 2 summarizes the details experimental conditions applied for co-gasification experiments using TGA.

TABLE 2

Summary of experimental conditions used for co-gasification

| Variable | Experimental condition |
|---|---|
| Temperature range (° C.) | 30-600 |
| Sample/reference crucible | Alumina |
| Heating rate (° C./min) | 5, 10, 20 (default), 30, 40, 60, 80 |

TABLE 2-continued

Summary of experimental conditions used for co-gasification

| Variable | Experimental condition |
| --- | --- |
| Operating pressure | Atmospheric |
| Operating mode | Ramp, non-isothermal |
| Purge gas (gasification agent) | Nitrogen (default), Air, $CO_2$ |
| Purge gas flowrate (mL/min) | 50, 100 (default), 200, and 300 |
| Sample mass (mg) | ~70 |

The terms carrier gas, purge gas and gasification agent may be used synonymously; for an industrial scale process the term "gasification agent" is generally preferred.

Effect glucose (biomass) concentrations. One of the major advantages of co-gasification is the availability of oxygen in the biomass. This facilitates the gasification process and produces a high quality hydrogen/syngas. An appropriate balance of VGO and biomass is essential in order to achieve the best possible performance in terms of feed conversion and product quality. The presence of oxygen may also facilitate in-situ energy supply due to the exothermic reaction between the oxygen molecules and the hydrocarbons.

Taking this into consideration, the co-gasification of VGO/glucose, experiments were conducted using various VGO and glucose compositions of 0, 10, 15, 20, 25, 30, and 50 weight percentage glucose and balanced VGO. The non-isothermal co-gasification experiments were conducted between 30-600° C. at a heating rate of 20° C. /min.

FIG. 2 shows the weight loss (TGA) profiles and differential weight loss (DTGA) profiles during the co-gasification of various VGO/glucose samples as a function of temperature. The TGA profiles show the range of gasification temperatures, while DTGA curves provide the information on sample reactivity as the peak height is directly proportional to sample reactivity and peak temperature is inversely proportional to the sample reactivity; Vamvuka, D, E Kakaras, E Kastanaki, and P Grammelis. 2003, *Pyrolysis Characteristics and Kinetics of Biomass Residuals Mixtures with Lignite*, Fuel, 82:1949-60. doi:10.1016/S0016-2361 (03)00153-4, incorporated herein by reference in its entirety.

Table 3 summarizes the initial conversion temperature, peak temperature, and final temperature of co-gasification of different VGO/glucose samples.

Figure 2A:
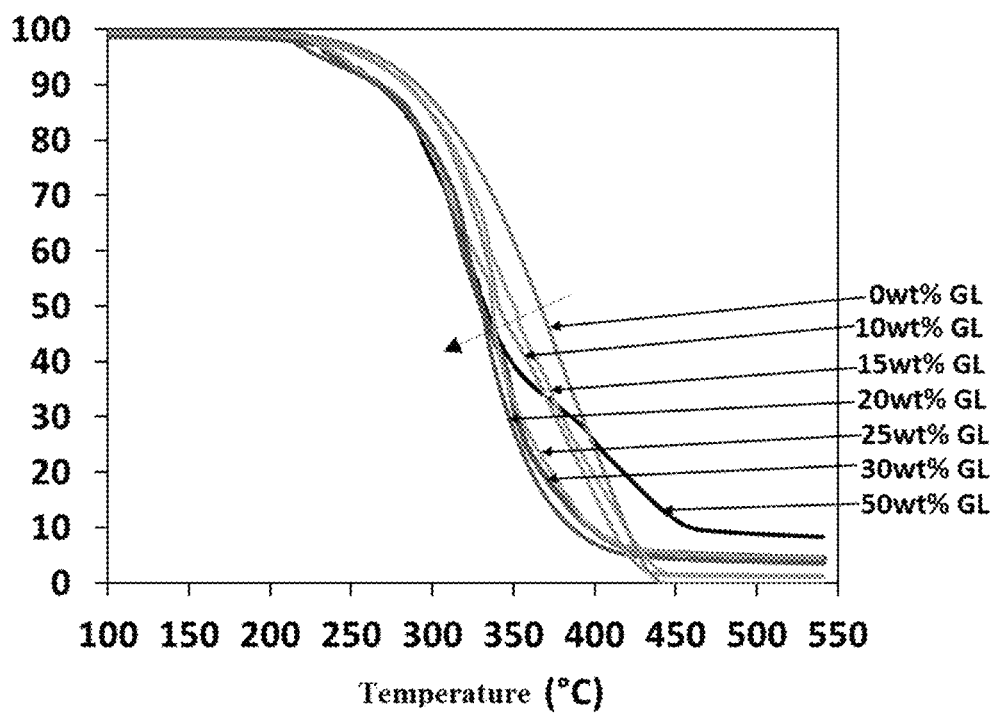
FIG. 2A. Experimental results of conversion versus temperature for co-gasification of different VGO/glucose (GL) blends at 20° C./min heating rate.

FIG. 2A shows that all the samples ranging from 0 to 50 wt % glucose had a similar single step weight loss profile between 220 and 450° C. However, the weight loss of the samples varied with the variation of the glucose in the feed. The curve based on 0 wt % glucose was further to the right and other weight loss curves shifted to the left with increasing glucose content (as indicated by upper arrow). This result may be attributed to an increased amount of oxygen in the feed which contributed to an accelerated gasification process. Shifts in the weight loss curves were considerable up to 25 wt. % glucose sample, however further increases of glucose content resulted in a negligible shift of the weight loss curves except for 50 wt % glucose which exhibited less weight loss at the higher temperatures. Based on this observation, gasification of biomass and VGO could be advantageously performed using a content of biomass (glucose in these data) of about 25 wt %.

Figure 2B:
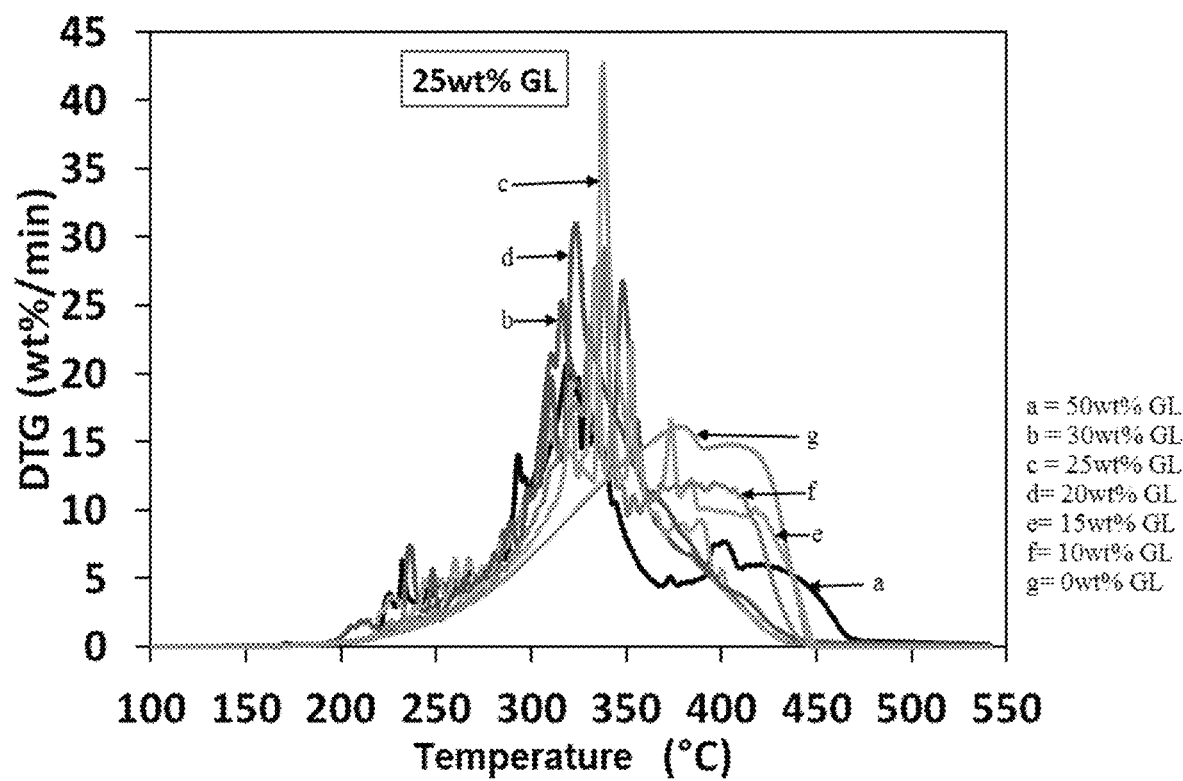
FIG. 2B. Experimental results of derivative weights versus temperature for co-gasification of different VGO/glucose (GL) blends at 20° C./min heating rate.

The effects of glucose concentration were further analyzed by comparing the DTGA curves as shown in FIG. 2B. The maximum value of DTGA for all samples located within the temperature range of 306-378° C. The smallest DTGA peak was found to be 16.09 wt. %/min only VGO sample (Table 3). The height of the peaks increased with increasing the weight percentage of glucose up to 25 wt %. Further increase of glucose content resulted in a subsequent decrease in the DTGA peak height. The maximum height of the peak was found to be 42.70 wt. %/min with 25 wt. % glucose. The peak height of 30 wt. % and 50 wt. % glucose containing sample were appeared at 26.81 and 20.89 wt. %/min, respectively. While coal and VGO different in composition, these results are consistent with previous studies on co-gasification of coal with raw biomass including switchgrass and pine sawdust.

The biomass used in this example was extra pure glucose and a promotional effect may be ascribed to a high oxygen content in the glucose that adds to the feedstock and contributes to both the gasification and combustion reactions. Further advantages may be obtained from biomass that contains catalytic components such as alkali and earth minerals.

Figure 3:
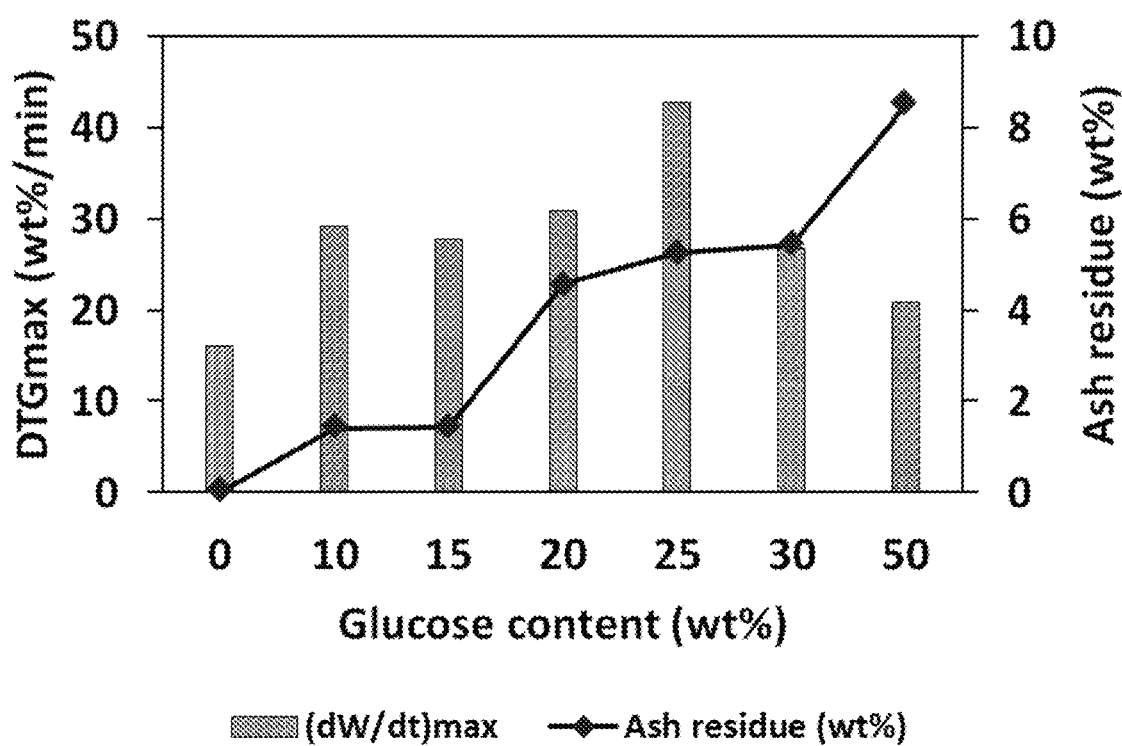
FIG. 3. Maximum derivative weights during the process and ash content leftover after the process for co-gasification of different VGO/glucose blends at 20° C./min heating rate.

Furthermore, for each mixed sample, the TGA profile reached its final temperature at which the difference of weight loss is becoming negligible. The residual weight is attributed to the ash and/or the unreacted materials. It was found that increasing the biomass content resulted in increasing the leftover weight regardless of any other variables as depicted in FIG. 3. This may be attributed to the initial constituents of the feedstock for which the biomass contains much higher amount of ash than that in VGO.

The feed samples--VGO and glucose--were physically mixed with different weight percentages using magnetic stirrer mixer under heating for 10 mins. Each sample was placed in an alumina crucible to conduct the thermochemical analysis using the TGA. The gasifying agent was perpendicularly purged with respect to the curable to provide sufficient amounts of reactant and to leach the product that may cause hindering the rate of forward gasification reactions. Different gasifying agents were studied, i.e. N2, air and CO2. The weight of ash leftover upon completing the process was accurately measured using a 200 gram×0.001 gram high resolution digital balance scale.

TABLE 3

Initial, peak, and final temperatures of co-gasification of different VGO/glucose samples at a heating rate of 20° C./min

| Glucose content | Temperature (° C.) | | | $DTG_{max}$ |
| --- | --- | --- | --- | --- |
| (wt %) | Initial | Peak | Final | (wt%/min) |
| 0 | 147.56 | 378.37 | 446.9 | 16.09 |
| 10 | 187.04 | 338.73 | 450.86 | 29.17 |
| 15 | 149.03 | 333.77 | 449.11 | 27.81 |
| 20 | 181.91 | 324.05 | 464.78 | 30.87 |
| 25 | 185.84 | 337.66 | 458.47 | 42.7 |
| 30 | 172.56 | 348.09 | 476.47 | 26.81 |
| 50 | 165.52 | 329.18 | 521.6 | 20.89 |

The effects of the biomass contents on the co-gasification were further analyzed by comparing the $T_{50}$ and $R_{50}$ of different VGO/glucose samples, as reported by Chen and Kuo; Chen, Wei Hsin, and Po Chih Kuo. 2010, *A Study on Torrefaction of Various Biomass Materials and Its Impact on Lignocellulosic Structure Simulated by a Thermogravimetry*, Energy 35 (6): 2580-86. doi:10.1016/j.energy.2010.02.054, incorporated herein by reference in its entirety. $T_{50}$ is the temperature at which the sample lost 50 wt. % of its initial weight and $R_{50}$ is the rate of weight loss at that point (50% wt loss). According to Chen and Kuo, higher $R_{50}$ indicates that the feedstock is more active at $T_{50}$ (Chen and Kuo, id. 2010).

Figure 4:
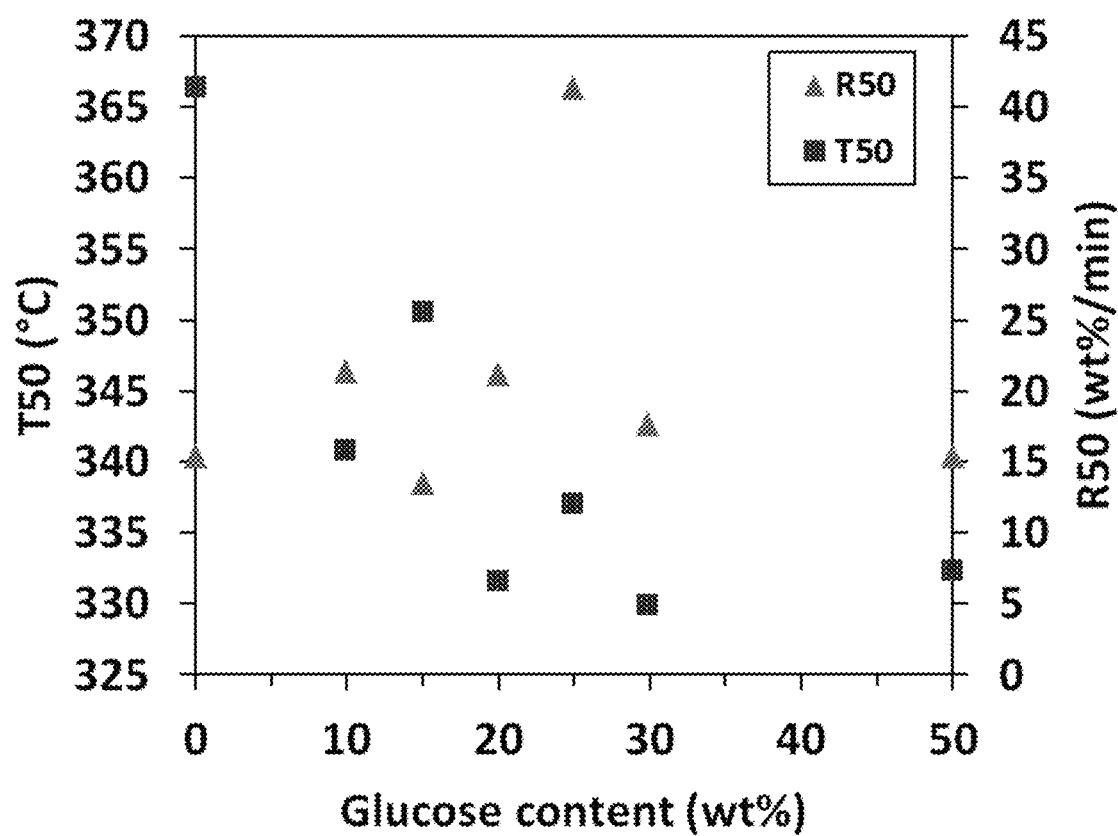
FIG. 4. $T_{50}$ and $R_{50}$ profiles of different VGO/glucose blends during gasification in TGA (thermogravimetric analysis) at a heating rate of 20° C./min.

FIG. 4 plots the $T_{50}$ and corresponding $R_{50}$ of various glucose containing VGO/glucose samples. It was observed that the $T_{50}$ of the samples significantly varied between 366.4° C. and 340.8° C. as the ratio of biomass to VGO increases from 0 wt. % to 10 wt %, respectively. Furthermore, it fell from 331.45° C. at 20 wt. % biomass until it reached 332.4° C. at 50 wt.% biomass in close range of variations. On the other hand, the $R_{50}$ shows a close variation of values between 13.57 wt %/min and 21.44 wt %/min for all blends expect for the mixture with 25 wt. % biomass that shows a remarkable value of 41.33 wt %/min. This result is consistent with this blend showing the best performance via proving that the rate of weight loss or reaction intensity is significantly high at the $T_{50}$.

Figure 5A:
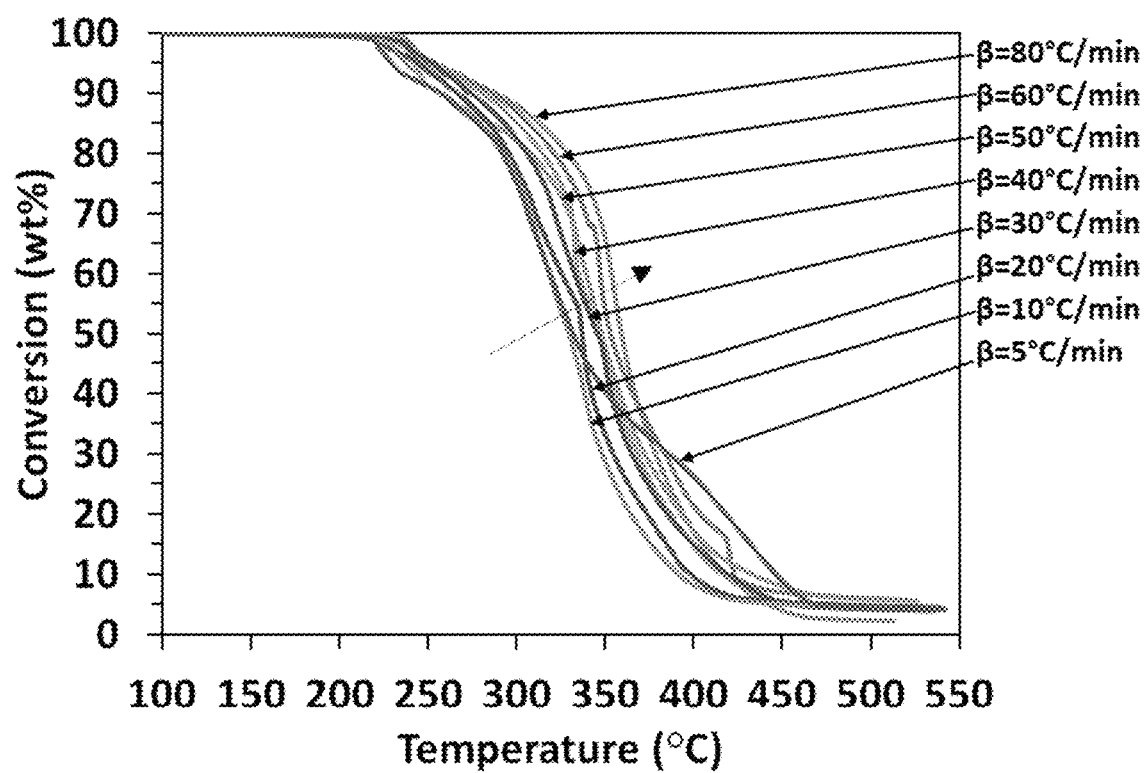
FIG. 5A. Experimental results of conversion versus temperature for co-gasification of 25 wt. % glucose blend at different heating rates.

Effects of heating rate. FIG. 5 shows the TGA and DTGA profiles of 25 wt. % glucose containing VGO/glucose sample at different heating rates which were varied between 5 and 80° C./min in order to exhibit the reactivity of the sample at slow, moderate, and fast heating conditions. FIG. 5A shows that the weight loss curves shifted to a higher temperature as the heating rate was increased. This observation suggests that the fast heating does not provide enough time for the co-gasification process consistent to the corresponding reaction temperature.

Figure 5B:
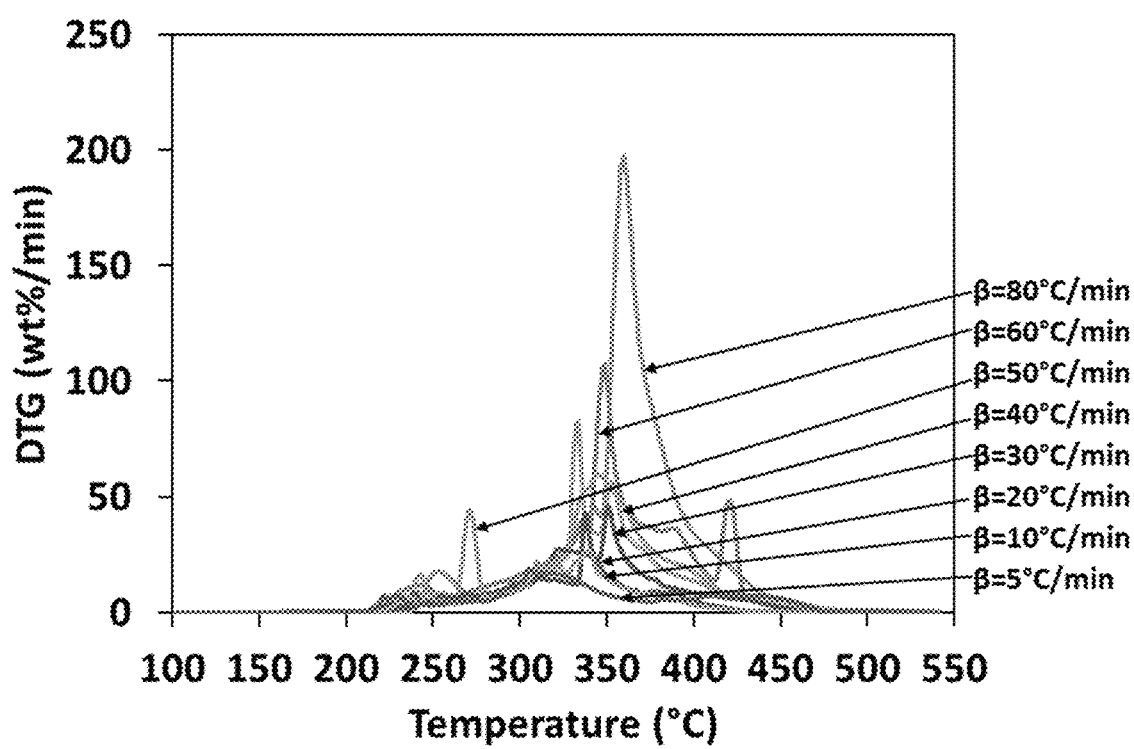
FIG. 5B. Experimental results of derivative weights versus temperature for co-gasification of 25 wt. % glucose blend at different heating rates.

In order to ascertain this, the DTGA profiles were plotted in FIG. 5B which exhibits a major peak at each heating rate that corresponds to the maximum rate of gasification. It appears that the maximum weight loss peak has been shifted to the higher temperature as the heating rate increased.

Figure 6A:
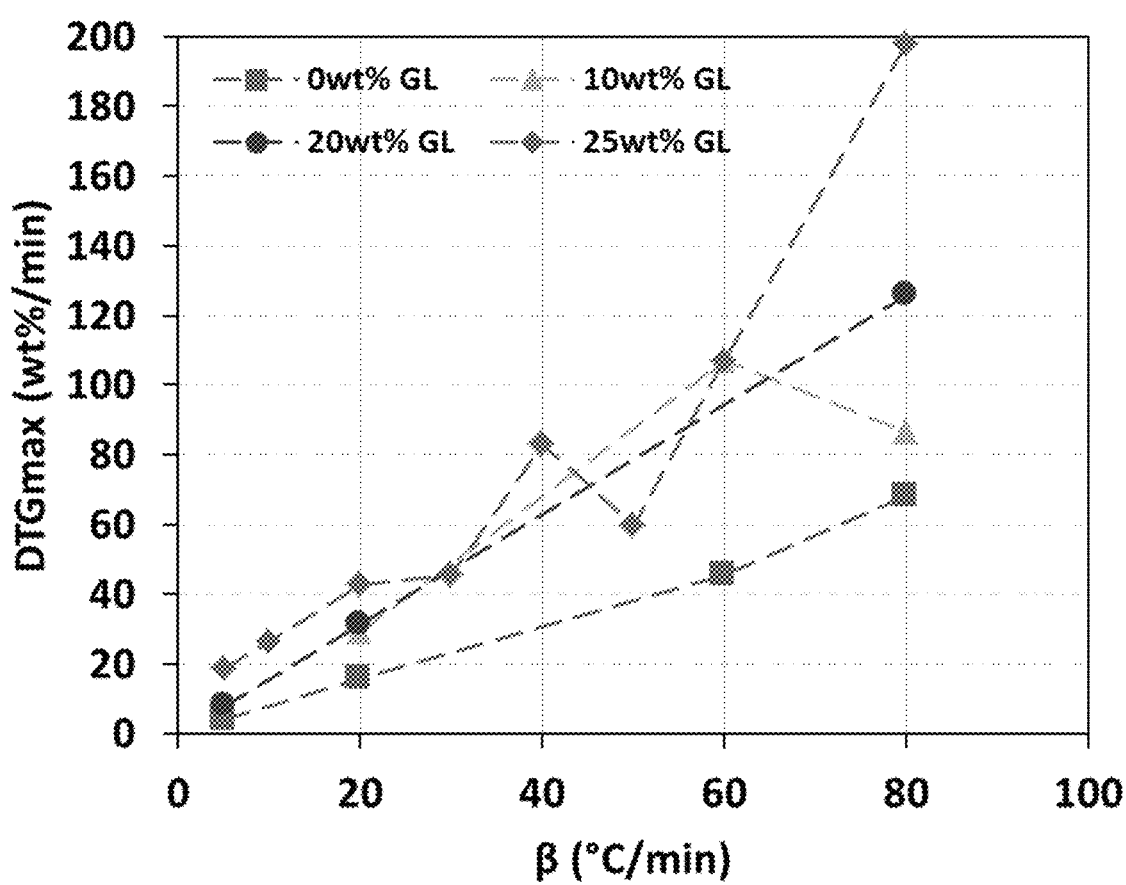
FIG. 6A. Experimental results of values of maximum derivative TG for co-gasification of different blends of VGO/glucose (GL).

In order to demonstrate the effects of heating rate on the feed composition, the co-gasification experiments were also conducted with a blend containing 0 wt %, 10 wt%, 20 wt.% and 25 wt. % glucose. FIG. 6A shows that the blend with 25 wt. % glucose presented the best values of maximum derivative TG with increasing the heating rate having a $DTG_{max}$ of 200 at a heating rate 80° C./min.

Figure 6B:
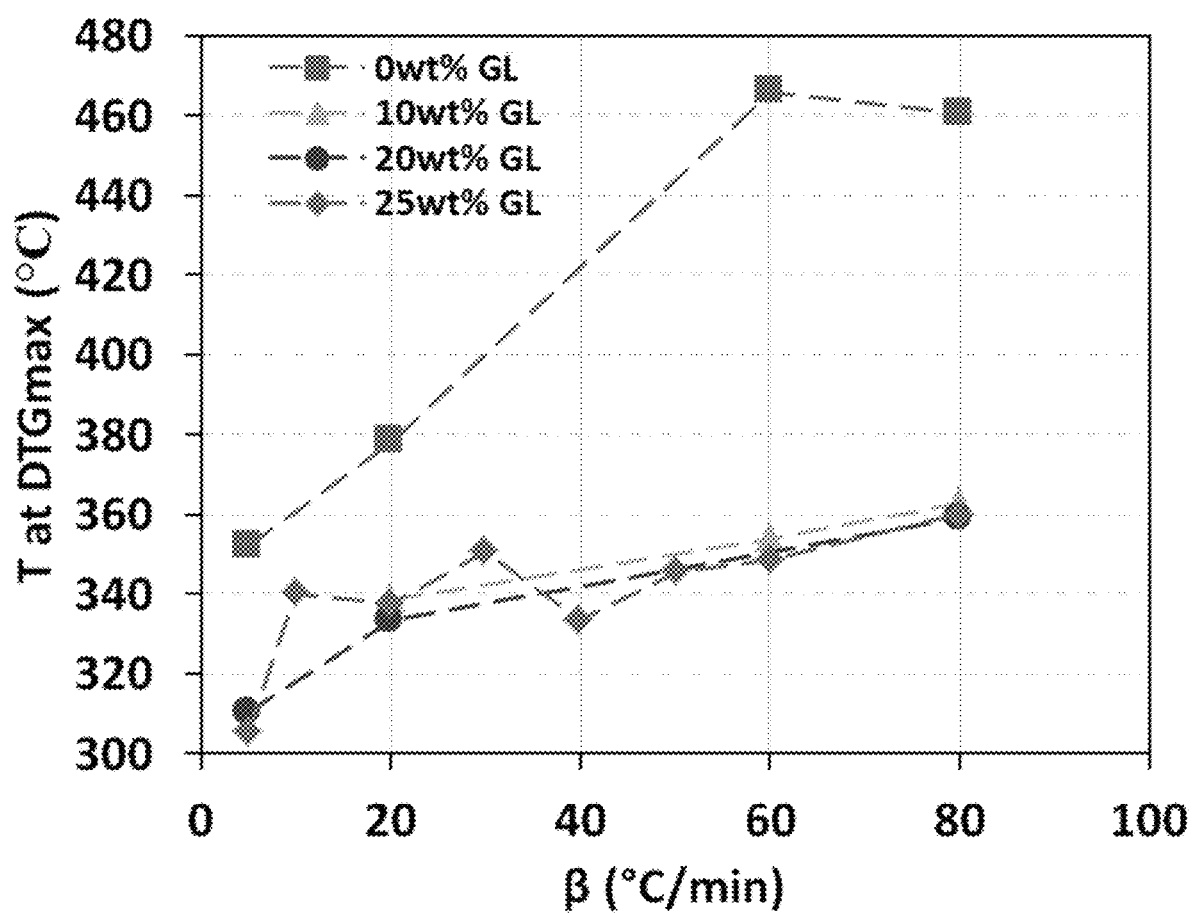
FIG. 6B. Experimental results of values of temperature at maximum derivative TG versus heating rate for co-gasification of different blends of VGO/glucose.

FIG. 6B shows that the temperature at which the DTGA profile reaches its peak exhibited close range of variations for the 10 wt %, 20 wt %, and 25 wt. % glucose blend with increasing the heating rate, however, the maximum derivative TG of the 0 wt. % glucose blend is reached at higher values of temperature versus heating rate. This may be attributed to the lack of a synergic effect which is provided by adding glucose.

Figure 7A:
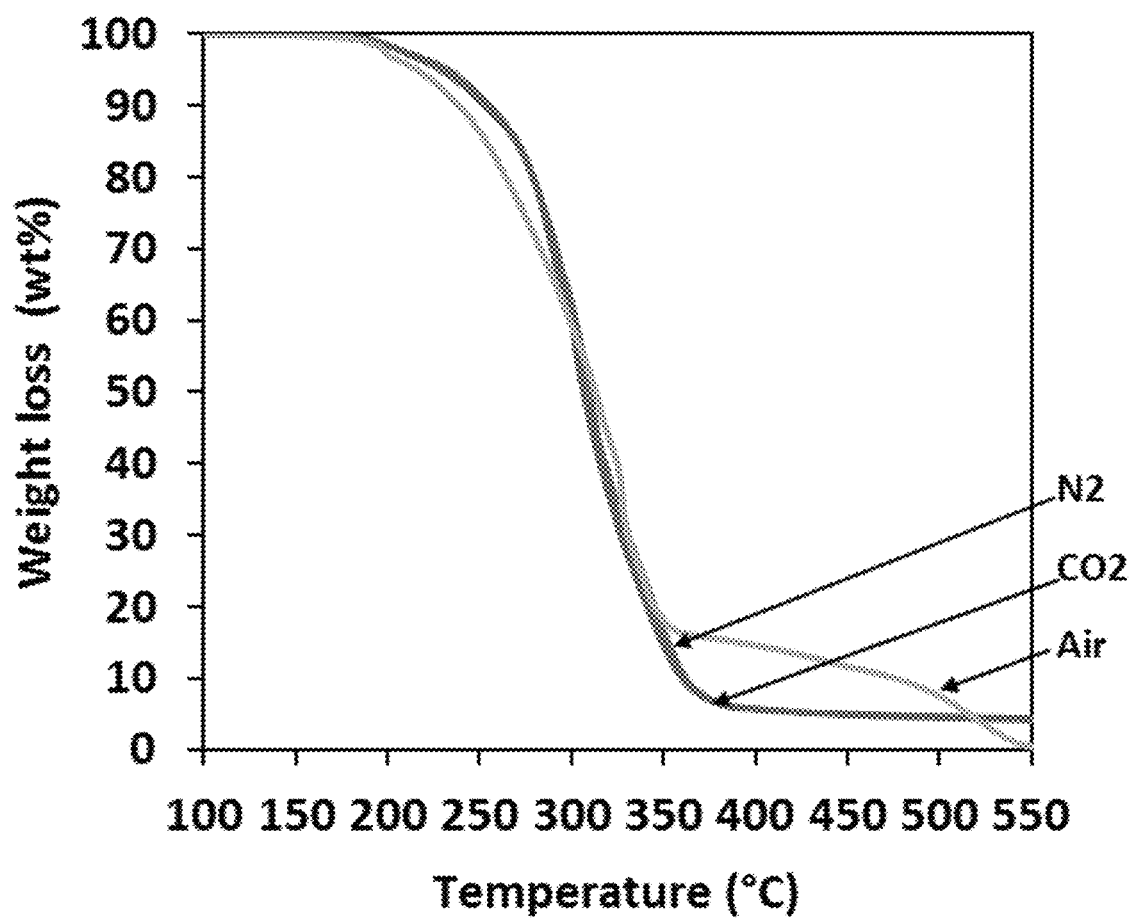
FIG. 7A. Experimental results of conversion at 5° C./min heating rate for co-gasification of 20 wt. % glucose blend for $N_2$, $CO_2$, and air gasification agents at 100 mL/min flow rates.
Figure 7B:
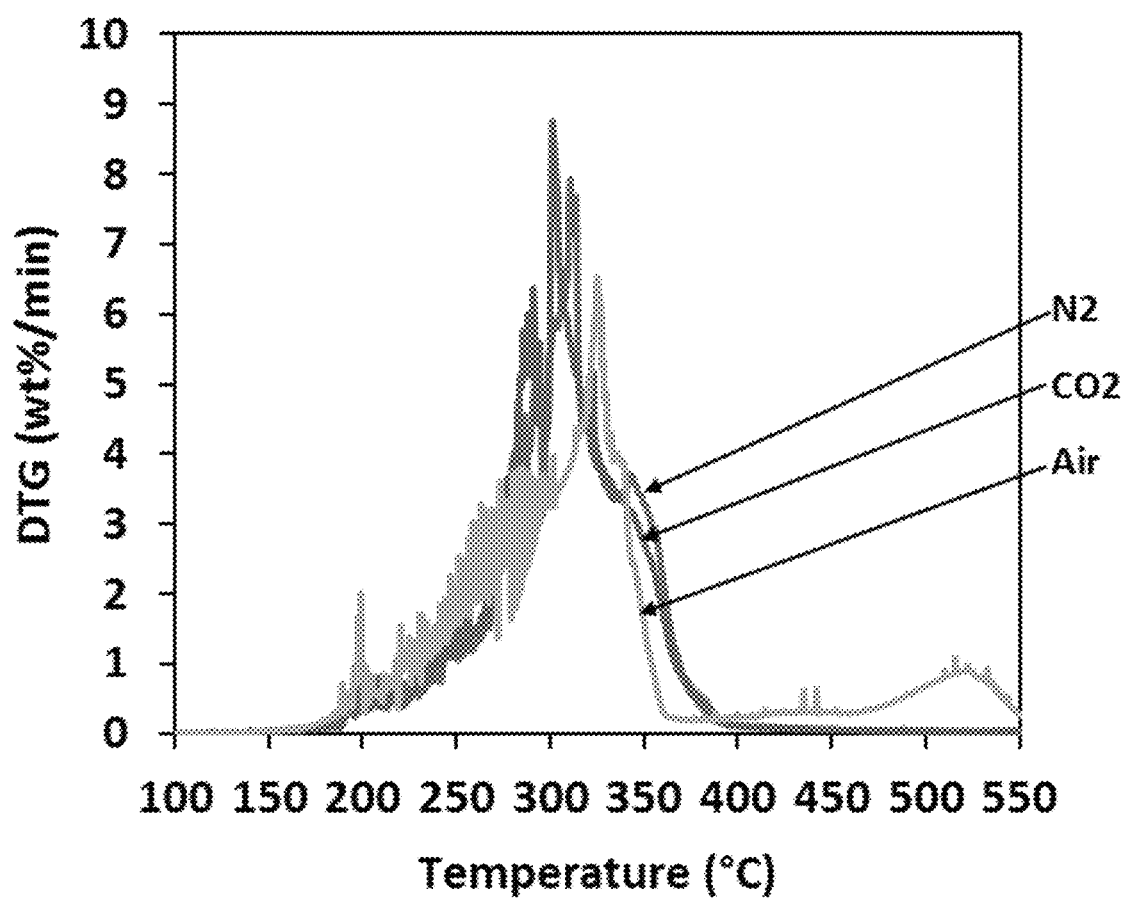
FIG. 7B. Experimental results of derivative weights at 5° C./min heating rate for co-gasification of 20 wt. % glucose blend for $N_2$, $CO_2$, and air gasification agents at 100 mL/min flow rates.

Effect of gasification agent. The effects of gasifying agent (carrier gas) on co-gasification were conducted with nitrogen, air, and carbon dioxide using 20 wt. % glucose containing sample as feedstock. The carrier flow rates were varied between 50-300 mL/min while the heating rate was varied from 5 to 80° C./min. For low heating rate at 5° C./min, TGA profiles of gasification with nitrogen and $CO_2$ depicted in FIG. 7A are showing almost identical trends with single step. However, the run using air as a gasification agent gave a second step at 344° C. This observation indicates that the combustion of chars was enhanced due to the presence of air as is consistent with the weight fraction of the leftover residue of the gasification which is infinitesimally small for the gasification with air at 0.325 wt. % compared with 4.31 wt. % and 4.09 wt. % for the $CO_2$ and nitrogen, respectively. These results are confirmed by the DTGA profiles that show maximum values at very close at 8.76 wt %/min, 7.93 wt %/min, and 6.52 wt %/min, respectively.

Figure 7C:
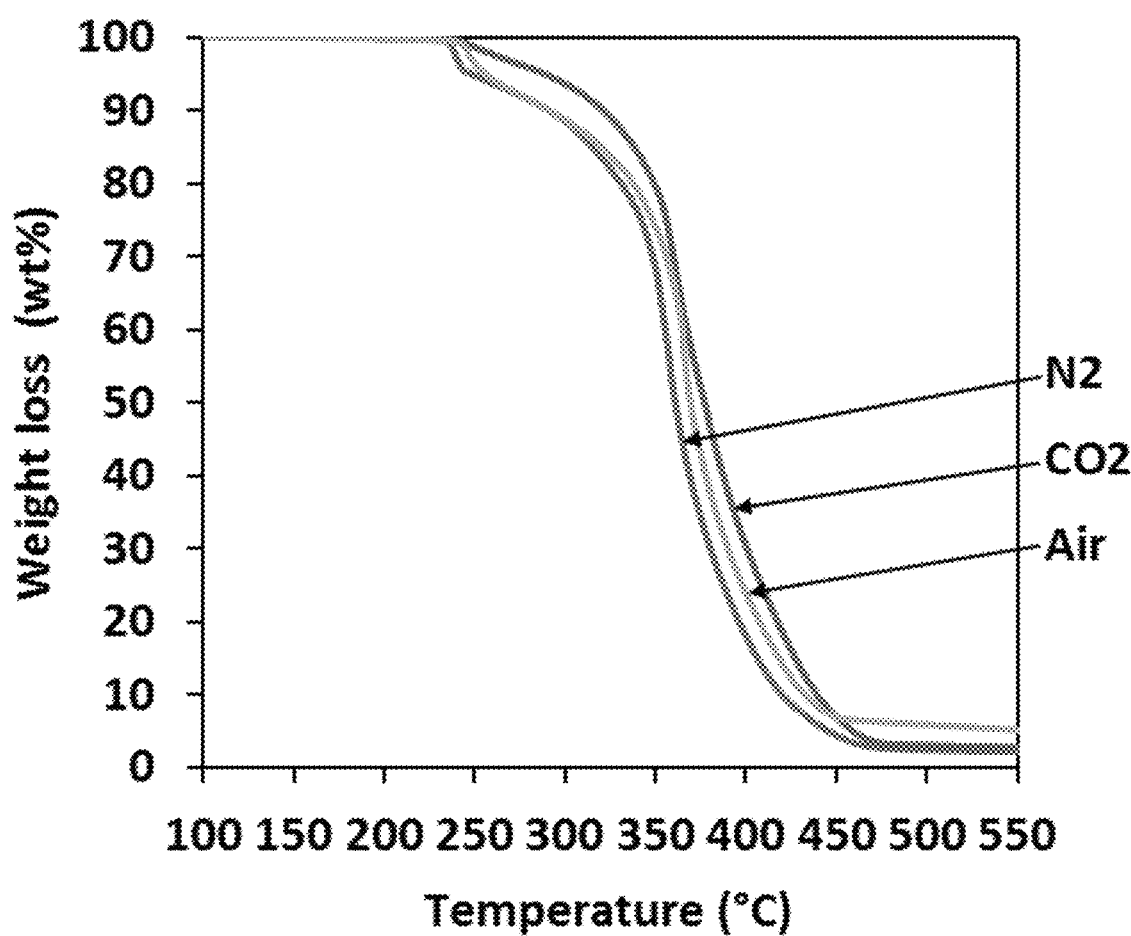
FIG. 7C. Experimental results of conversion at 80° C./min heating rate for co-gasification of 20 wt. % glucose blend for $N_2$, $CO_2$, and air gasification agents at 100 mL/min flow rates.

On the contrary, when high heating rate is applied, the weight loss curves presented in FIG. 7C are shifted to the left in the order of using $CO_2$, air, and nitrogen, respectively.

Figure 7D:
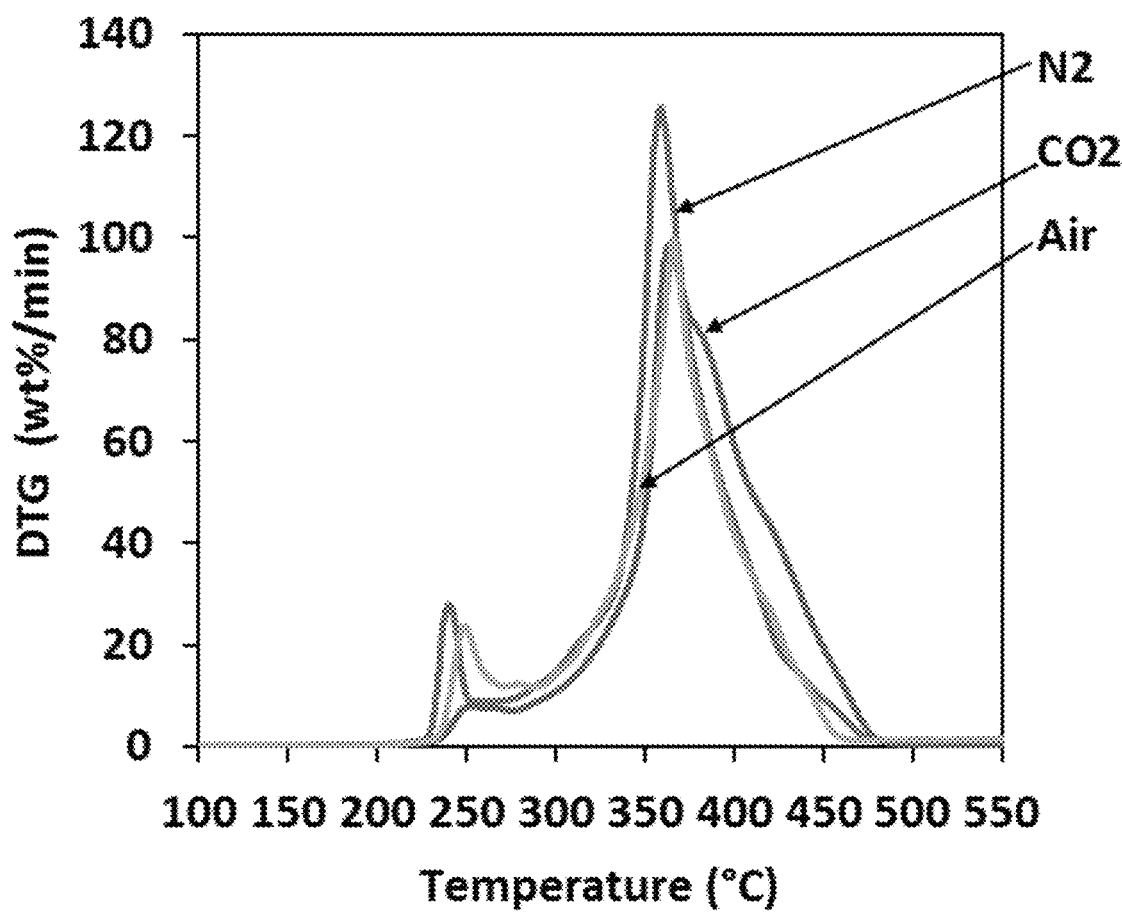
FIG. 7D. Experimental results of derivative weights at 80° C./min heating rate versus temperature for co-gasification of 20 wt. % glucose blend for $N_2$, $CO_2$, and air gasification agents at 100 mL/min flow rates.

The derivative weight loss profiles shown in FIG. 7D clarify this result by comparing the $DTG_{max}$ values which is the highest for nitrogen at 125.7 wt %/min compared with 98.59 wt %/min and 99.79 wt %/min for $CO_2$ and air, respectively.

Applying higher heating rate caused the reaction to proceed faster. The purging flowrate was constant in both cases of heating rates, so for the case of 80° C./min the gas flowrate was not sufficient for taking up the formed gaseous products. Consequently, the probability of reverse reactions that include the purging gas increases.

Applying $CO_2$ as gasification agent, which is also a product of the co-gasification taking place that includes water-gas shift and combustion reactions, reduces the rate of the forward reactions consistent with Chatelier's principle, since that carbon dioxide is a product of gasification reactions.

Figure 8A:
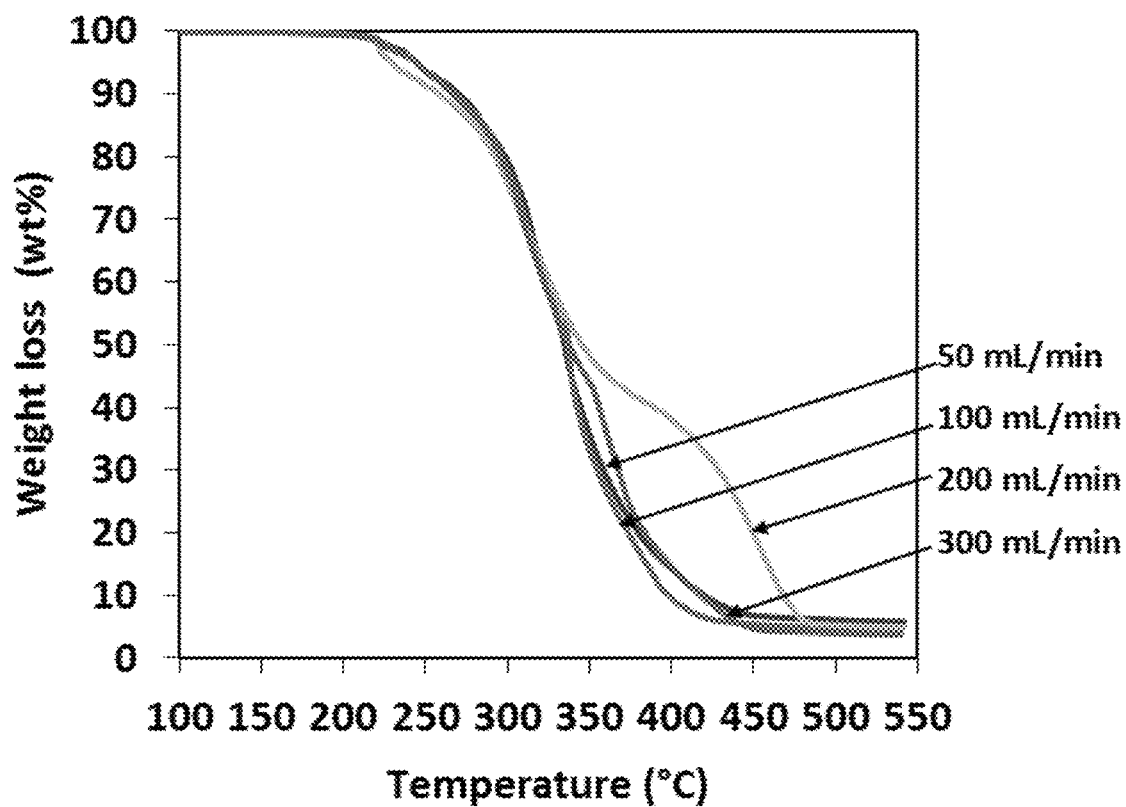
FIG. 8A. Experimental results of conversion for co-gasification of 25 wt. % glucose blend in 20° C./min heating rate at different gas flowrates.
Figure 8B:
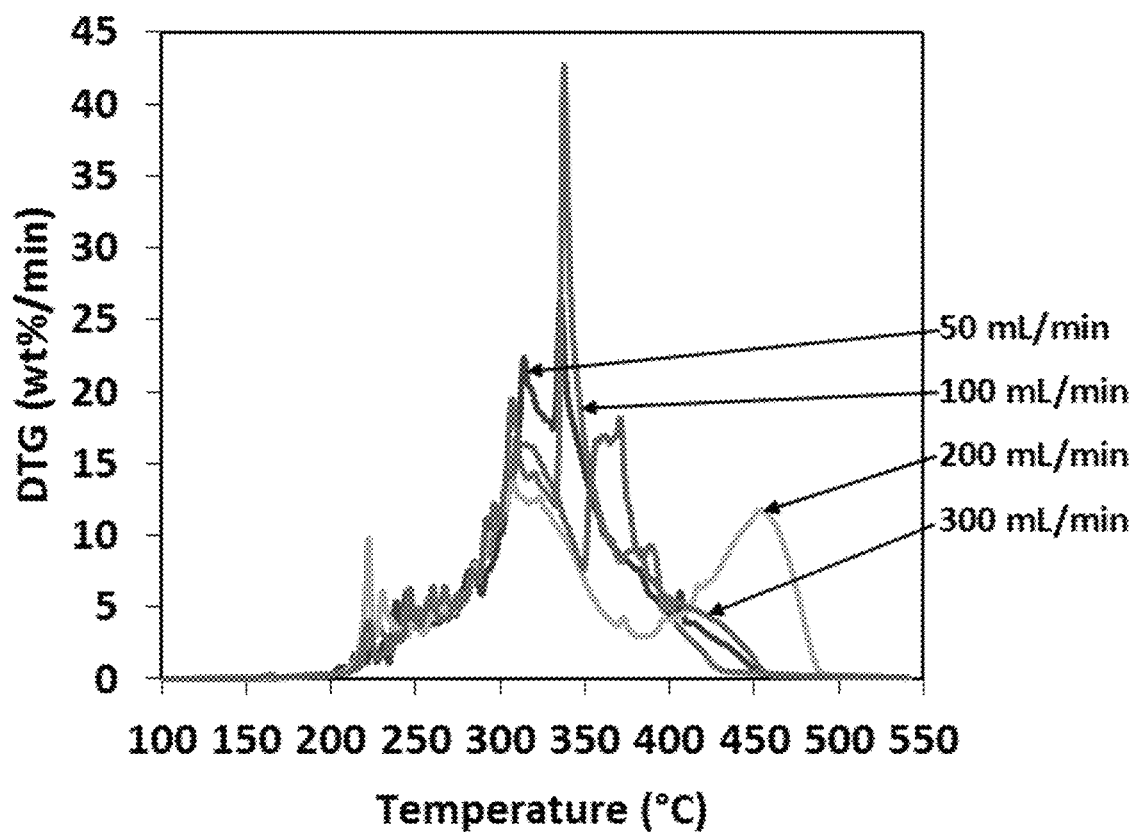
FIG. 8B. Experimental results of derivative weights versus temperature for co-gasification of 25 wt. % glucose blend in 20° C./min heating rate at different gas flowrates.

The effect of applying different purging gas flow rates was studied on a chosen 25 wt. % glucose blend in 20° C./min heating rate under $N_2$ gasification medium at different flow rates (i.e. 50, 100, 200, and 300mL/min). FIG. 8A shows the weight loss profiles experienced different trends for each run of gasification with different carrier gas flow rate. Among other profiles, the run with 200 mL/min flowing rate is the most one shifted to the left at 308° C., however, for a higher range of temperature starting from 339° C., the weight loss profile of the run with 100 mL/min carrier gas flow rate was found to be favored in this regard. The maximum values of derivative weights for the co-gasification were highly affected by varying the purging gas flow rates as shown in FIG. 8B.

Figure 9:
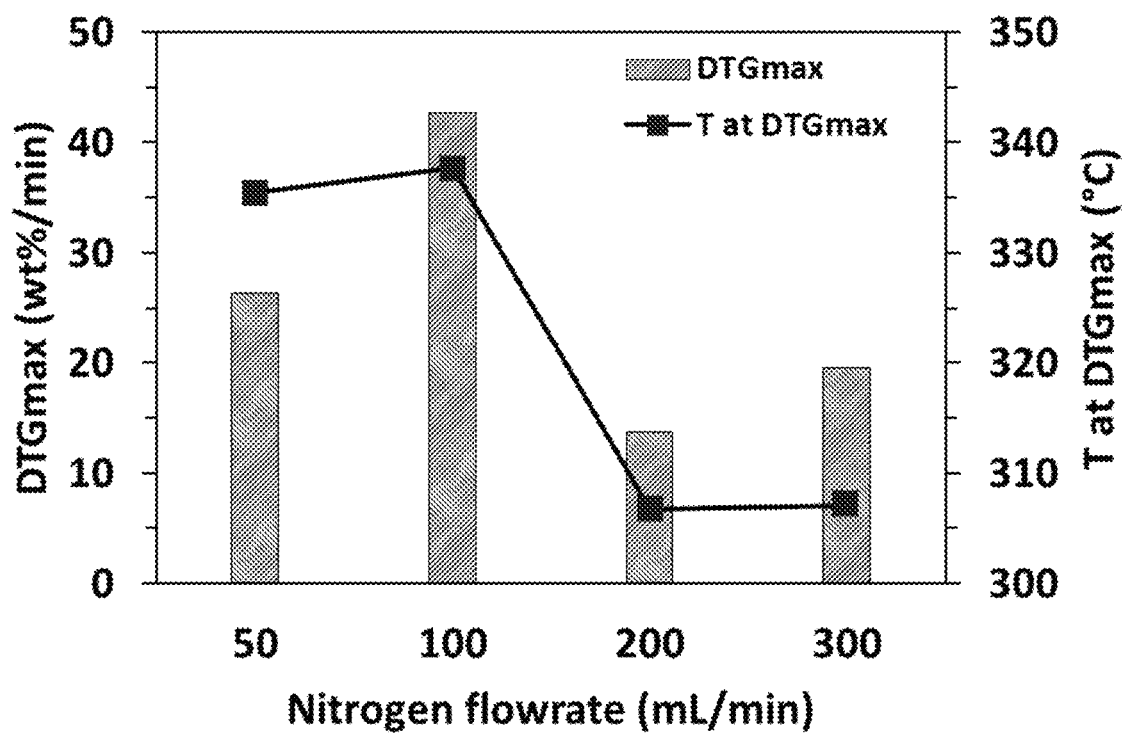
FIG. 9. Maximum derivative weights during the process and temperature at maximum derivative weights for co-gasification of 25 wt. % glucose blend in 20° C./min heating rate at different nitrogen gas flow rates.

The maximum value of DTG increases with increasing the nitrogen flow rate from 50 mL/min up to 100 mL/min then decreases as the flow rate reaches to 300 mL/min as per results summarized in FIG. 9. Also, the temperature at which the DTG is maximum is around 336° C. for the 50 and 100 mL/min. However, it falls down to 307° C. when the flow rate increases to 200 and 300 mL/min. The behavior of reaching an optimum value of the DTG at 100 mL/min nitrogen flow rate could be attributed to two competing variables. Increasing the purging gas flow rate enhances the gasification reactions by means of effectively removing the products formed which pushes the forward reactions to take place. Nevertheless, a negative effect happens when the purge gas flow rate is increased to higher rate where the rate of cooling through convection is increasing as well. Cooling the reactant during the process destructively influences the rate of gasification through losing some of the energy required for the reactions to proceed forward. Most previous studies considered the use of one flow rate that was chosen after series of preliminary tests conducted at increasing gas flow rates to avoid the influence of the external diffusion limitations on the measured rate of the gasification process. However, applying this method is not entirely reliable for gasification in thermogravimetric analyzer where the bed of fuel is being in a crucible lying below its mouth. A gasification agent confined in the region between the bed surface and the crucible mouth is stagnant.

Kinetics modeling. The kinetics analysis of non-isothermal co-gasification was conducted analyze the effects of different process variables such as the nature of the gasification agent, variation of feed concentration, and reaction temperature on the gasification reaction rates. The estimation of the kinetic parameters provides an insight of the reactions involved in gasification that is useful for gasifier design and gasification process operating conditions.

Biomass and VGO can contain a large variety of different chemical species, thus the co-gasification process can involve a simultaneous series different parallel reactions. In this regard, lumped kinetics modeling approach is useful to determine the apparent kinetics parameters without following the details mechanism of the complex reactions. The lumping kinetics modeling is commonly used in heavy oil upgrading by using the discrete or the continuous approaches; Ancheyta, Jorge, Sergio Sánchez, and Miguel A Rodriguez. 2005, *Kinetic Modeling of Hydrocracking of Heavy Oil Fractions: A Review, Catalysis Today*. doi: 10.1016/j.cattod.2005.08.015; and Bdwi, Emad A. S., Syed A. Ali, Mohammad R. Quddus, Saad A. Al-Bogami, Shaikh A. Razzak, and Mohammad M. Hossain. 2017, *Kinetics of Promotional Effects of Oil-Soluble Dispersed Metal (Mo, Co, and Fe) Catalysts on Slurry Phase Hydrocracking of Vacuum Gas Oil*. Energy & Fuels 31 (3): 3132-42. doi: 10.1021/acs.energyfuels.6b03322, each incorporated herein by reference in their entirety.

However, the co-gasification of carbonaceous material with glucose follows different techniques of lumping that apply the nth-order kinetic models which is given by(Lu and Do, id. 1994):

$$\frac{d\alpha}{dt} = kf(\alpha) \quad (1)$$

where, $\alpha$ is the fractional conversion of feedstock and is defined as:

$$\alpha(t) = \frac{W_0 - W(t)}{W_0 - W_{ash}} \quad (2)$$

$W_0$ is the initial weight of the feedstock, $W(t)$ is the instantaneous weight of the reactant at time t, and $W_{ash}$ is the weight of the leftover material after the process. k is the apparent rate constant of gasification process, that can be expressed by Arrhenius Equation (3), $$k = k_o \exp\left(\frac{-E_a}{RT}\right) \quad (3)$$

$k_o$ is the pre-exponential factor, $E_a$ is the apparent activation energy, and R is the universal gas constant. The function $f(\alpha)$ in Equation (1), describes the variations in the chemical or physical properties of the feedstock during the gasification process. There are three formulations of $f(\alpha)$ which are widely encountered for kinetic modeling of gasification and co-gasification processes: (i) homogenous reaction model or volume reaction model, (ii) the grain model or shrinkage core model, and the random pore model (RPM); Ishida, M, and C Y Wen. 1971, *Isothermal Analysis* 26: 1031-41; Szekely, J, and J W Evans. 1970, *A Structure Model for Gas Solid Reactions with a Moving Boundary*, Chemical Engineering Science 25. Pergamon Press: 1091-1107; and Bhatia, S. K., and D. D. Perlmutter. 1980, *A Random Pore Model for Fluid-solid Reactions: I. Isothermal, Kinetic Control*, AIChE Journal 26 (3). American Institute of Chemical Engineers: 379-86. doi:10.1002/aic.690260308, incorporated herein by reference in its entirety.

The homogeneous reaction model is based on the assumption that the diffusion of gas within solid reactant, such as biomass or coal, is uniform within entire particle and the gasification reactions that take place uniformly on the inside and outside of the particle (Fermoso et al., id. 2009) It also assumes that gasification reactions are taking while the surface area of reaction is decreasing linearly with the conversion. The homogenous reaction model or volume reaction model (Ishida and Wen 1971) is expressed as:

$$f_{VRM}(\alpha) = (1-\alpha) \quad (4)$$

On the other hand, the shrinkage core model proposed by Szekely and Evans (Szekely and Evans, id. 1970) suggests that the reaction are taking place on nonporous grains that are considered to be the building materials of the porous particle of the feedstock. The reaction kinetic model is based on the assumption that the grains are being in spherical shape, so the overall reaction rate is expressed as follow:

$$f_{GM}(\alpha) = (1-\alpha)^{2/3} \quad (5)$$

Figure 10A:
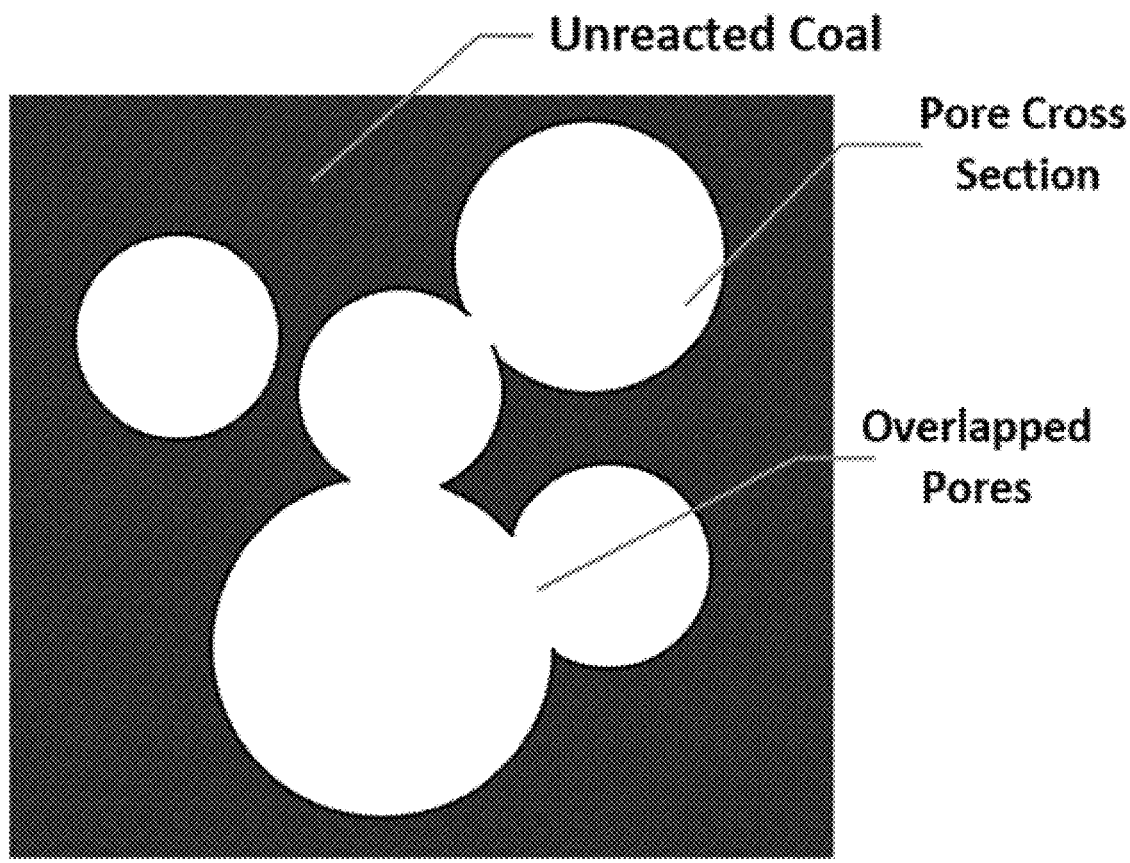
FIG. 10A. Schematic of the process modeled by RPM in case of (A) solid coal.
Figure 10B:
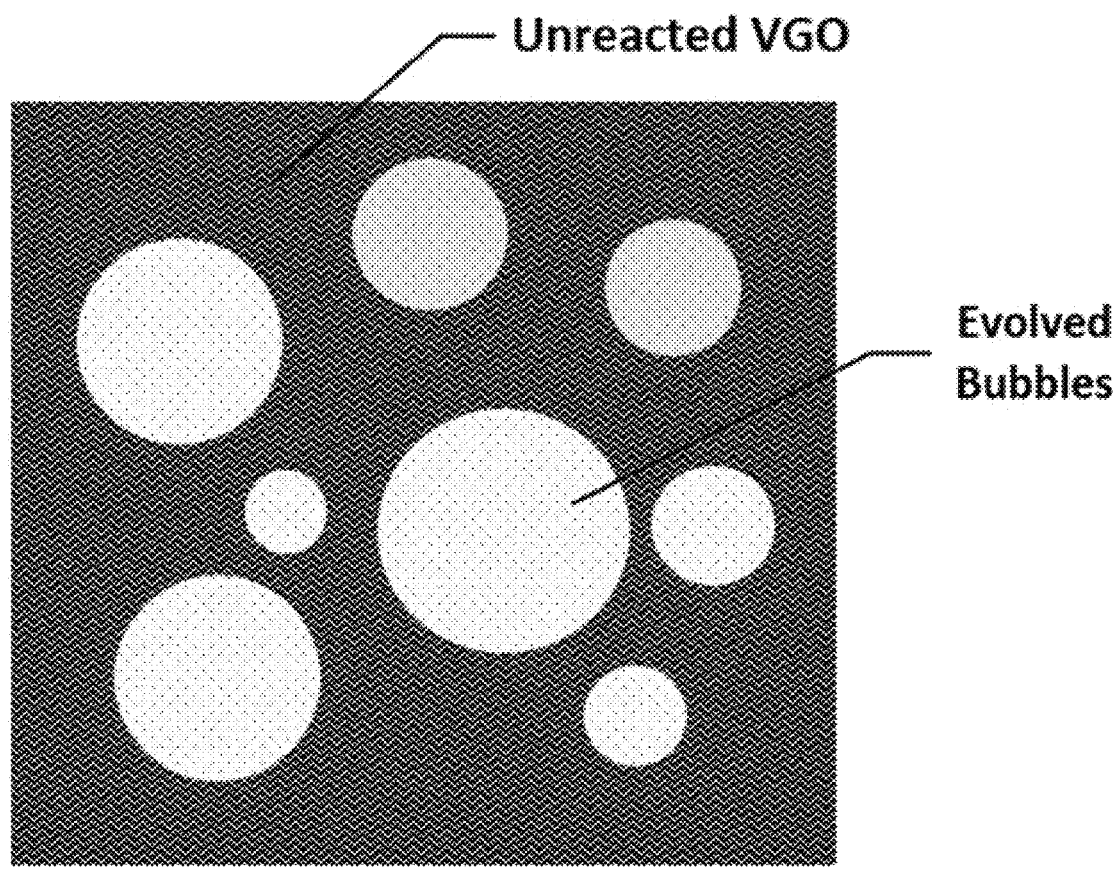
FIG. 10B. Schematic of the process modeled by RPM in case of liquid VGO.

The random pore model (RPM) proposed by Bhatia and Perl-mutter (Bhatia and Perlmutter, id. 1980) suggests that the surface of reaction is reduced due to overlapping of the pore surfaces present in the fuel. Thus, the proposed model involves the physical changes of happens to pores during the gasification process such as their growth at the initial stages of gasification and destruction during the subsequent step because of the coal coalescence of the adjacent pores. The RPM is shown in the as follows:

$$f_{RPM}(\alpha) = (1-\alpha)\sqrt{[1-\psi\ln(1-\alpha)]} \quad (6)$$

and it is noticed that the parameter $\psi$ is introduced to take into account the pores structure effects on the gasification kinetics. Although that the random pore model has been developed for modeling fluid-solid reactions, the model is applied to our liquid feedstock, that is VGO, taking into account that the geometric constant is describing the evolving of the bubbles that relates to the diffusion effects during gasification process instead of rate of pores overlapping as present in solid feedstock such as coal of petcoke. FIG. 10 shows a schematic diagram of the process that would be modeled with the aid of the random pore model in the conventional case of solid feedstock, as coal, compared with the liquid feedstock used which is VGO.

Based on the definitions proposed for the three models, it can be noticed that the volume reaction model and the grain model are not suitable choices for predicting the gasification behavior because the rate of reaction monotonously decreases with conversion (Ding et al., id. 2014). Therefore, the random pore model was chosen as being most predictive of coal gasification, biomass gasification, and co-gasification of coal and biomass; Everson, Raymond C., Hein W.J.P. Neomagus, Rufaro Kaitano, Rosemary Falcon, and Vivien M. du Cann. 2008, *Properties of High Ash Coal-Char Particles Derived from Inertinite-Rich Coal: II. Gasification Kinetics with Carbon Dioxide*. Fuel 87 (15-16): 3403-8. doi:10.1016/j.fuel.2008.05.019; Fermoso, J, C Stevanov, B Moghtaderi, B Arias, C Pevida, M G Plaza, F Rubiera, and J J Pis. 2009, *High-Pressure Gasification Reactivity of Biomass Chars Produced at Different Temperatures*. Journal of Analytical and Applied Pyrolysis 85 (1-2): 287-93. doi: 10.1016/j.jaap.2008.09.017; Jeong, Hwang, and Hwang 2015; Massoudi Farid, Massoud, Hyo Jae Jeong, and Jungho Hwang. 2015, *Co-Gasification of Coal-Biomass Blended Char with $CO_2$ and $H_2O$: Effect of Partial Pressure of the Gasifying Agent on Reaction Kinetics*, Fuel 162: 234-38. doi:10.1016/j fuel.2015.09.011; and Ding et al. 2014, each incorporated herein by reference in their entirety.

The gasification process is conducted in TGA at non-isothermal conditions, so the temperature changes at a function of time is given as:

$$T = T_o + \beta t \quad (7)$$

where, $T_o$ is the initial temperature of the reaction and $\beta$ is the heating rate. Thus, temperature profile equation could be derived with time ($dT/dt=\beta$) and substituted in Equation (1) to give, $$\frac{d\alpha}{dT} = \frac{k_o}{\beta}\exp\left(\frac{-E_a}{RT}\right)(1-\alpha)\sqrt{[1-\psi\ln(1-\alpha)]} \quad (8)$$

The parameters of the of the gasification reaction, which are $k_o$, $E_a$, and $\psi$, were evaluated by implementing MATLAB software.

Use of Equation (8) in a process of VGO/biomass gasification is an aspect of the invention. The derived equation (8) is based on the modified random pore model. In contrast, the equation is used in the invention for modeling liquid feedstocks since that the process is assumed to be conducted at two consecutive steps: (i) fast pyrolysis and (ii) gasification, as shown FIG. 10A and FIG. 10B. The gasification step of the remaining char is modeled with random pore model.

Equation (8) is solved numerically by fitting the experimental data resulted from the TGA through least-squares method. This is done firstly by solving the differential equation using a belt in subroutine which is (ode45) that applies Runge-Kutta-Gill method. Then, the non-linear fitting is accomplished by the (*lsqcurvefit*) subroutine, which is an optimization method that minimizes the sum of squares by following Levenberg-Marquardt algorithm. The data points were taken over the entire range of weight loss that is represented by $W_{fraction}$ between 0-1. The parameters were estimated at 95% confidence limit and performance of the model was assessed by determining the coefficient of determination ($R^2$) insuring that the low SSR (sum of the squares of the residuals), low cross-correlation coefficient ($\gamma$) as well as Individual confidence intervals for the model parameters are attained.

Kinetic Parameters Estimation and Model Evaluation. The reaction rate equation derived from the random pore model, Equation (8), was solved and fitted to get the apparent activation energy as well as the pre-exponential factor. Kinetic parameters estimation was carried out on the experimental results gained by testing different VGO/glucose blends at specific heating rate at 20° C./min.

Table 4 presents the results of the nth-order kinetic parameter estimated for the 0 wt %, 10 wt %, 15 wt %, 20 wt %, 25 wt %, 30 wt %, and 50 wt. % glucose blends along with their confidence intervals.

VGO/glucose blends ranged between 31.72 kJ/mol and 24.03 kJ/mol, except for the blend with 50 wt. % glucose which showed a lower value at 16.05 kJ/mol. This drop in apparent activation energy value was credited to domination of glucose content gasification that needs lower energy to be activated for accomplishing the reactions compared with petroleum carbonaceous feedstocks, such as coal and pet-coke.

Figure 12A:
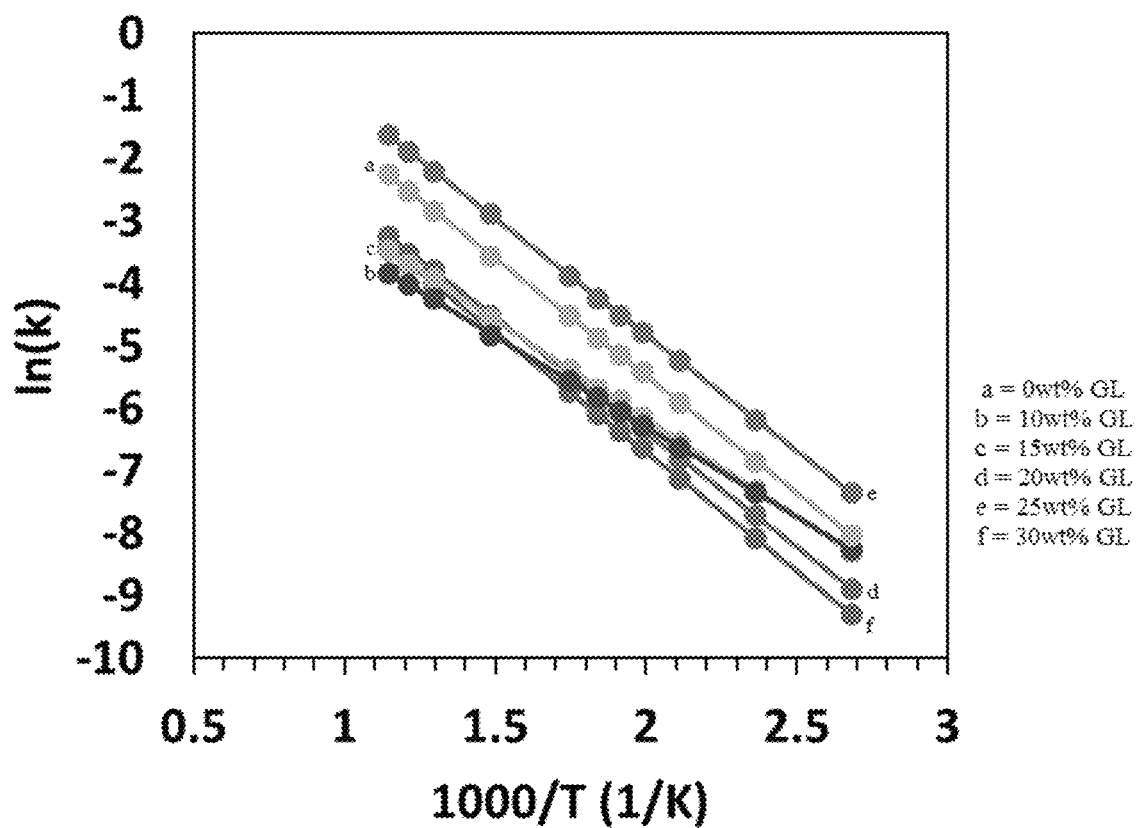
FIG. 12A. Reaction rate constants isotherms computed based on random pore model.
Figure 12B:
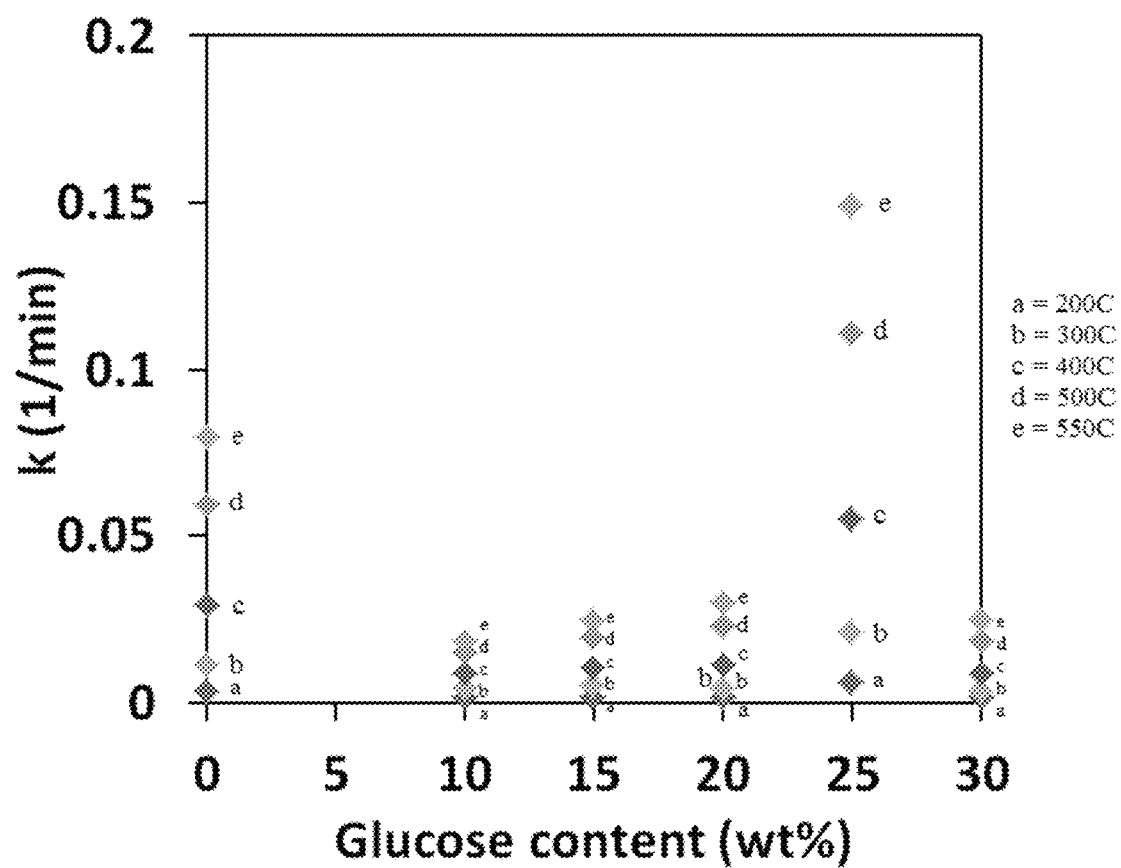
FIG. 12B. Reaction rate Arrhenius plots computed based on random pore model.

The Arrhenius plot shown in FIG. 12A was obtained by linearizing Equation (3) from which the pre-exponential factors and the activation energies were derived from Table 4 after modeling the experimental data using the RPM. It was noticed that as the temperature increased, the value of ln(k) linearly decreased. The values of reaction rate constants of the co-gasification of different blends of glucose and VGO were calculated at different temperatures (i.e., 200, 300, 400, 500, 550° C.) to form isotherms plots. Results depicted in FIG. 12B show that among all isotherms of the reaction rate constants, the 25 wt. % glucose (GL) blend produced the maximum value.

As shown by the Examples, co-gasification processes were conducted on different blends of VGO/glucose ratios using non-isothermal thermogravimetric analysis (TGA) that was applied different heating rates to study their effects on co-gasification behavior. The results indicate that the blending ratio of VGO/glucose affects the degree of co-gasification process. The maximum derivative weight loss increases with increasing the glucose content in the feedstock, however, the blend with 25wt. % glucose which has the highest value of maximum DTG at 42.70 wt %/min. Apparent activation energy acquired by modeling and fitting the experimental data shows values ranging between 63.20 kJ/mol and 75.28 kJ/mol expect for the blend with 50wt. % glucose that shows a lower value at 46.22 kJ/mol. The drop in $E_a$ value is attributed to the domination of glucose content gasification that needs lower energy to be activated for accomplishing the reactions compared with petroleum carbonaceous feedstocks. Effect of heating rate of co-gasification was studied at different values between 5° C./min and 80° C./min. The DTG profiles shows that the heating rate is directly proportional effect of rate of reaction. Kinetic modeling shows that the value of $E_a$ is found to be almost constant at ~70 kJ/mol for all heating rates studied except for the 5° C./min and 80° C./min. It is claimed that for the range of heating rate between 10 and 50° C./min, the process holds inherently similar reactions, however, for very low heating rate and high heating rate other reactions tend to be favored which affects the kinetic parameters. Gasification agents,

TABLE 4

Kinetic parameters determined for co-gasification of different blends of VGO/glucose at 20° C./min heating rate.

| | | | nth-order (RPM) parameters | | | |
|---|---|---|---|---|---|---|
| GL content (wt %) | $E_a$ (kJ/mol) | 95% C.I. | $k_0$ (1/min) | 95% C.I. | $\psi$ | 95% C.I. |
| 0 | 31.2266 | {30.877, 31.5761} | 7.59E+00 | {6.3072, 8.87412} | 317.9057 | {2.5109E+2, 3.84715E+2} |
| 10 | 24.0254 | {23.2084, 24.8424} | 5.93E−01 | {0.156208, 1.1705} | 4.51E+03 | {−0.29231, 1.19344} |
| 15 | 26.1139 | {25.5628, 26.6649} | 1.11E+00 | {0.484924, 1.74430} | 2.47E+03 | {0.1761E+3, 4.76581E+3} |
| 20 | 30.5445 | {29.6866, 31.4023} | 2.60E+00 | {−0.109009, 5.31074} | 5.86E+03 | {−0.446787E+4, 1.618650E+4} |
| 25 | 30.9123 | {30.0380, 31.7865} | 1.36E+01 | {8.5799, 18.5795} | 226.2074 | {1.356327E+2, 3.16782E+2} |
| 30 | 31.7243 | {31.0768, 32.3717} | 2.52E+00 | {−0.77190, 5.10924} | 1.11E+04 | {−0.90341E+4, 3.11362E+4} |
| 50 | 16.0539 | {14.9857, 17.1221} | 1.35E−01 | {−0.043106, 0.31311} | 3.03E+03 | {−3.7744E+3, 9.83941E+3} |

Figure 11:
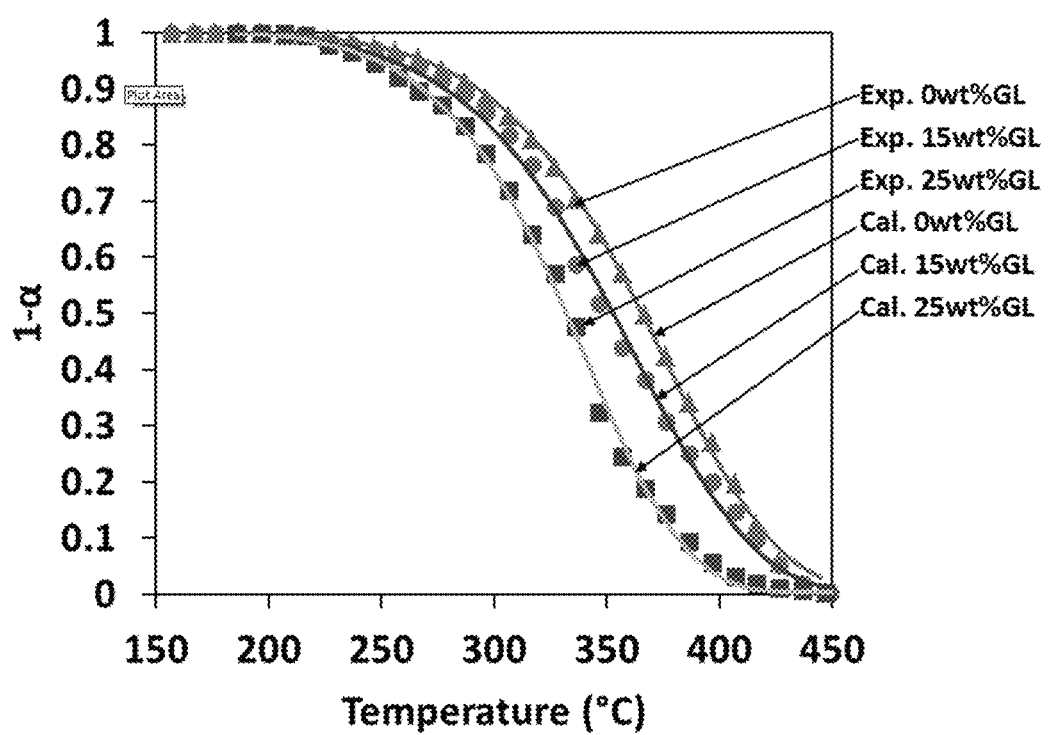
FIG. 11. Experimental and calculated conversion curves for co-gasification of VGO 0 wt %, 15 wt %, and 25 wt. % glucose (GL) at 20° C./min heating rate.

FIG. 11 shows that weight loss profiles calculated through the RPM show high levels of agreement with the experimental results. The values of apparent activation of all other that inert gas, was implemented to study their effects on process's performance. It is noticed that applying low heating rates would not make difference in $DTG_{max}$, however, it shows higher value for $N_2$ upon $CO_2$ at values of 125.7 wt %/min and 98.59 wt %/min, respectively.

Terminology. Terminology used herein is for the purpose of describing particular embodiments only and is not intended to be limiting of the invention.

Abbreviations and notations:

| | |
|---|---|
| $E_a$ | apparent activation energy for co-gasification, kJ/mol |
| $k_o$ | pre-exponential factor, 1/min |
| k | specific rate of the overall reaction, mol/min |
| $T_{max}$ | temperature at maximum derivative of weight loss, wt %/min |
| $T_o$ | initial temperature of the reaction, ° C. |
| $W_0$ | initial weight of the feedstock, mg |
| $W_{ash}$ | weight of the leftover material after the process, mg |
| DTG | derivative of weight loss, wt %/min |
| $DTG_{max}$ | maximum derivative of weight loss, wt %/min |
| R | universal gas constant, kJ/mol/° C. |
| t | TGA sampling time; reaction time, min |
| T | instantaneous temperature of the reactant, ° C. |
| W | instantaneous weight of the reactant, mg |
| $L_0$ | Pore length |
| $S_0$ | initial pore surface area |
| Greek letters | |
| α | degree of conversion of feedstock |
| β | heating rate, ° C./min |
| ψ | Geometric parameter, $\psi = \dfrac{4\pi L_0(1-\varepsilon_0)}{S_0^2}$ |
| $\varepsilon_0$ | Solid porosity |

The headings (such as "Background" and "Summary") and sub-headings used herein are intended only for general organization of topics within the present invention, and are not intended to limit the disclosure of the present invention or any aspect thereof. In particular, subject matter disclosed in the "Background" may include novel technology and may not constitute a recitation of prior art. Subject matter disclosed in the "Summary" is not an exhaustive or complete disclosure of the entire scope of the technology or any embodiments thereof. Classification or discussion of a material within a section of this specification as having a particular utility is made for convenience, and no inference should be drawn that the material must necessarily or solely function in accordance with its classification herein when it is used in any given composition.

As used herein, the singular forms "a", "an" and "the" are intended to include the plural forms as well, unless the context clearly indicates otherwise.

It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

As used herein, the term "and/or" includes any and all combinations of one or more of the associated listed items and may be abbreviated as "/".

Links are disabled by deletion of http: or by insertion of a space or underlined space before www. In some instances, the text available via the link on the "last accessed" date may be incorporated by reference.

As used herein in the specification and claims, including as used in the examples and unless otherwise expressly specified, all numbers may be read as if prefaced by the word "substantially", "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), +/−20% of the stated value (or range of values), etc. Any numerical range recited herein is intended to include all sub-ranges subsumed therein.

Disclosure of values and ranges of values for specific parameters (such as temperatures, molecular weights, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10 it also describes subranges for Parameter X including 1-9, 1-8, 1-7, 2-9, 2-8, 2-7, 3-9, 3-8, 3-7, 2-8, 3-7, 4-6, or 7-10, 8-10 or 9-10 as mere examples. A range encompasses its endpoints as well as values inside of an endpoint, for example, the range 0-5 includes 0, >0, 1, 2, 3, 4, <5 and 5.

As used herein, the words "preferred" and "preferably" refer to embodiments of the technology that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the technology. As referred to herein, all compositional percentages are by weight of the total composition, unless otherwise specified. As used herein, the word "include," and its variants, is intended to be non-limiting, such that recitation of items in a list is not to the exclusion of other like items that may also be useful in the materials, compositions, devices, and methods of this technology. Similarly, the terms "can" and "may" and their variants are intended to be non-limiting, such that recitation that an embodiment can or may comprise certain elements or features does not exclude other embodiments of the present invention that do not contain those elements or features.

The description and specific examples, while indicating embodiments of the technology, are intended for purposes of illustration only and are not intended to limit the scope of the technology. Moreover, recitation of multiple embodiments having stated features is not intended to exclude other embodiments having additional features, or other embodiments incorporating different combinations of the stated features. Specific examples are provided for illustrative purposes of how to make and use the compositions and methods of this technology and, unless explicitly stated otherwise, are not intended to be a representation that given embodiments of this technology have, or have not, been made or tested.

All publications and patent applications mentioned in this specification are herein incorporated by reference in their entirety to the same extent as if each individual publication or patent application was specifically and individually indicated to be incorporated by reference, especially referenced is disclosure appearing in the same sentence, paragraph, page or section of the specification in which the incorporation by reference appears.

The citation of references herein does not constitute an admission that those references are prior art or have any relevance to the patentability of the technology disclosed herein. Any discussion of the content of references cited is intended merely to provide a general summary of assertions made by the authors of the references, and does not constitute an admission as to the accuracy of the content of such references.

The invention claimed is:

1. A non-isothermic process for producing syngas, the process comprising:
    co-gasifying a feedstock comprising vacuum gas oil (VGO) and a biomass comprising glucose, and optionally further lignin and/or cellulose, by ramped heating the feedstock at a rate in a range of from 10 to 50°/min to a temperature in a range of from 306 to 378° C., thereby producing syngas comprising hydrogen and carbon monoxide,
    wherein the co-gasification is performed using a purge gas, carrier gas, or gasification agent supplied at a flow rate in a range of from 100 to 200 mL/min,
    wherein the VGO comprises $C_{20}$ through $C_{50}$ hydrocarbons and boils in the range of 350 to 600° C.,
    wherein the biomass has a C:H:O ratio in wt % of 35 to 40:4 to 6:50 to 55,
    wherein the feedstock comprises the biomass in 25 wt. % and the VGO in a range of from 70 to 80 wt. %, each based on a total weight of the feedstock, and
    wherein the process produces syngas having a higher content of hydrogen than an otherwise identical process that uses a feedstock consisting of the VGO, coke, or coal.

2. The process of claim 1, wherein the co-gasifying comprises ramped heating of the feedstock at a rate in a range of from 20 to 40° C./min.
3. The process of claim 1, wherein the gasification agent or purge gas is nitrogen.
4. The process of claim 1, wherein the gasification agent or purge gas is air.
5. The process of claim 1, wherein the gasification agent or purge gas is carbon dioxide.
6. The process of claim 1, wherein the biomass further comprises the cellulose.
7. The process of claim 1, wherein the biomass comprises switchgrass.
8. The process of claim 1, wherein the biomass comprises cardboard or paper.
9. The process of claim 1, wherein the biomass further comprises the lignin.
10. The process of claim 1, wherein the biomass comprises wood, sawdust, or another wood product.
11. The process of claim 1, wherein the biomass comprises, or is supplemented to comprise, an alkali or alkali earth metal catalyst in an amount in a range of from 0.001 to 1 wt. %, based on a total feedstock weight.
12. The process of claim 1, wherein at least part of the ramped heating is produced by combustion of the feedstock.
13. The process of claim 1, that produces syngas with a lower content of $SO_x$, $NO_x$, or $CO_2$ that an otherwise identical process that uses a feedstock consisting of VGO, coke, or coal.
14. The process of claim 1, wherein the biomass further comprises the lignin and the cellulose.
15. The process of claim 1, wherein the feedstock is heated in the absence of oxygen and all of the ramped heating is provided by an external source.
16. The process of claim 1, wherein the biomass consists of the glucose.

* * * * *